United States Patent [19]
Ohtsuka

[11] Patent Number: 5,388,100
[45] Date of Patent: Feb. 7, 1995

[54] RECEIVING CIRCUIT FOR DIGITAL DATA TRANSMITTED BY WIRELESS COMMUNICATION

[75] Inventor: Jun Ohtsuka, Fukuoka, Japan

[73] Assignee: Fujitsu Limited, Kanagawa, Japan

[21] Appl. No.: 126,381

[22] Filed: Sep. 24, 1993

[30] Foreign Application Priority Data

Feb. 26, 1993 [JP] Japan ................... 5-039015

[51] Int. Cl.[6] .............................................. H04B 7/08
[52] U.S. Cl. .................... 370/95.1; 375/100; 375/108; 455/133
[58] Field of Search ............... 370/66, 77, 95.3, 100.1, 370/95.1; 455/133, 134, 135, 136, 277.1, 277.2; 375/100, 108

[56] References Cited
U.S. PATENT DOCUMENTS

| | | | |
|---|---|---|---|
| 4,369,515 | 1/1983 | Valdes | 375/108 |
| 4,574,377 | 3/1986 | Miyazaki et al. | 375/108 |
| 4,651,103 | 3/1987 | Grimes | 375/108 |
| 4,953,163 | 8/1990 | Miyamoto et al. | 375/108 |
| 5,239,541 | 8/1993 | Murai | 375/100 |

*Primary Examiner*—Benedict V. Safourek

[57] ABSTRACT

A receiving circuit, which prevents spikes included in reproduced clock signals, caused by a time slot change in the division multiplex wireless communication or by the switching of diversity antenna, from being transmitted to the following circuits, and thereby eliminates errors in the determination of the received data, has a demodulator coupled to an antenna for demodulating signals received therefrom, a selector coupled to the demodulator for selecting from a plurality of clock signals reproduced from the data of the respective time slots, one of the reproduced clock signals. A time division timing control circuit is coupled to the selector and to a switching circuit, which control circuit is supplied with an internal clock signal from an internal clock generation circuit. The switching circuit is coupled to the output terminal of the selector and selects and outputs either the internal clock signal or the selected reproduced clock signal. The receiving circuit may be provided with a diversity control circuit.

3 Claims, 25 Drawing Sheets

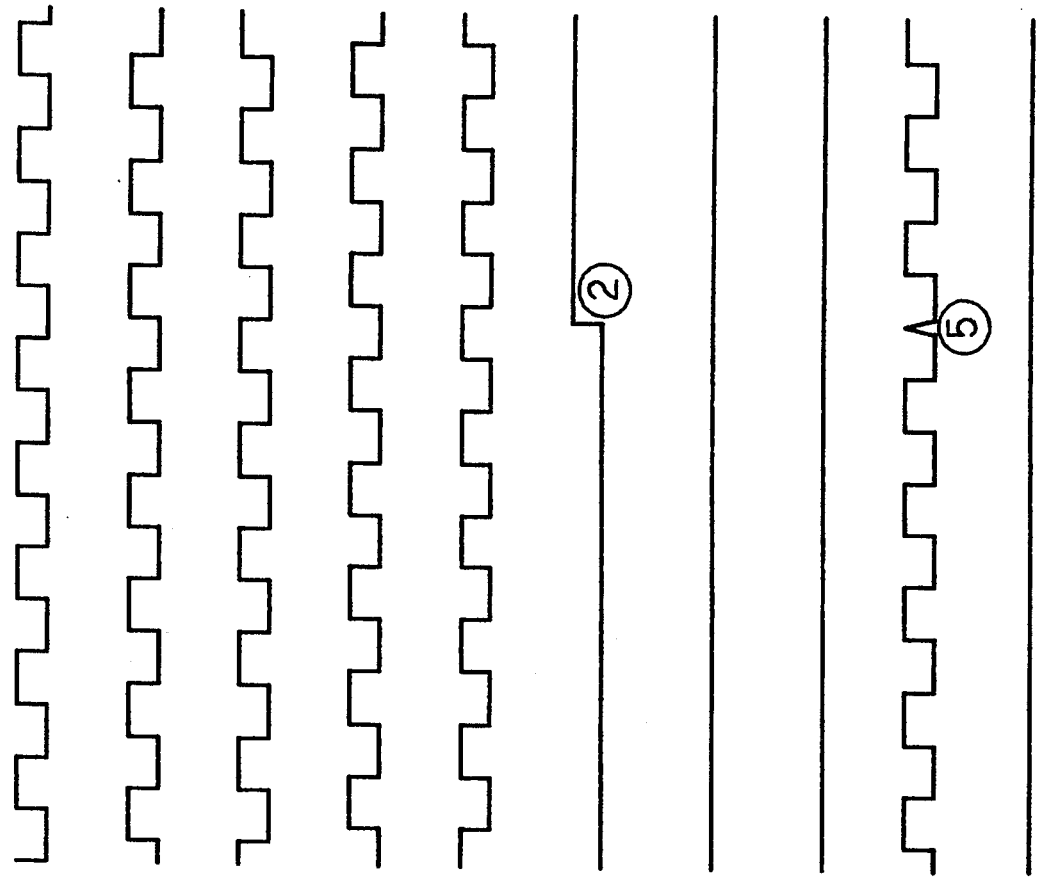

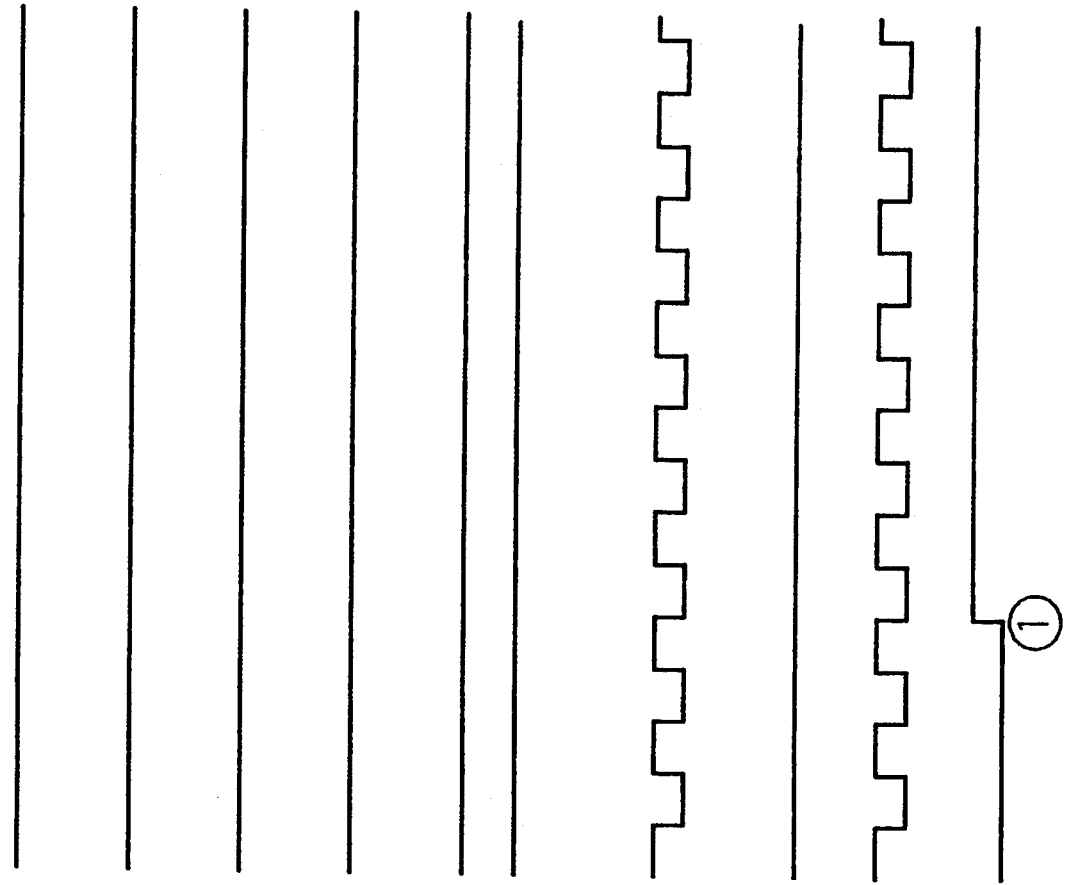

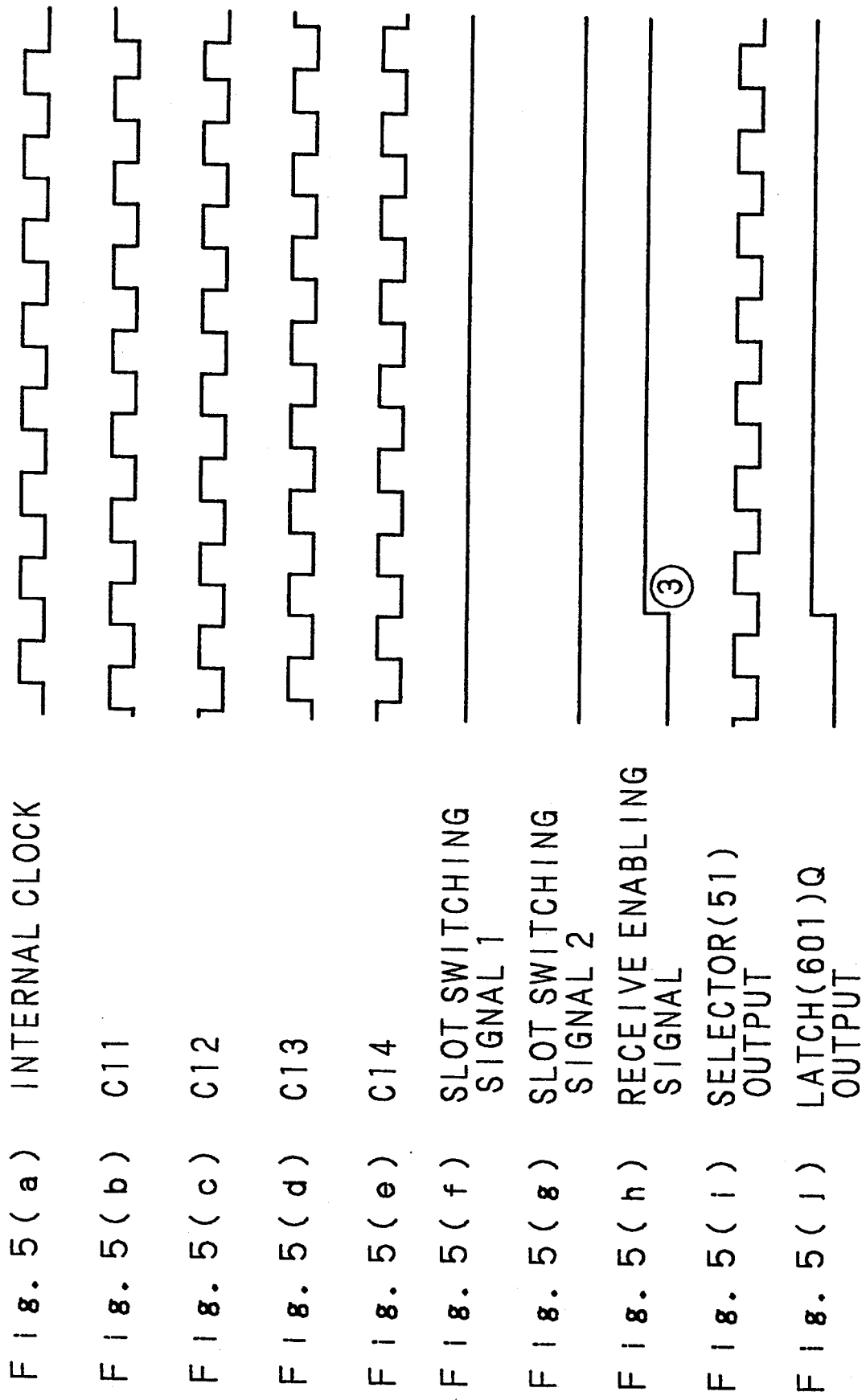

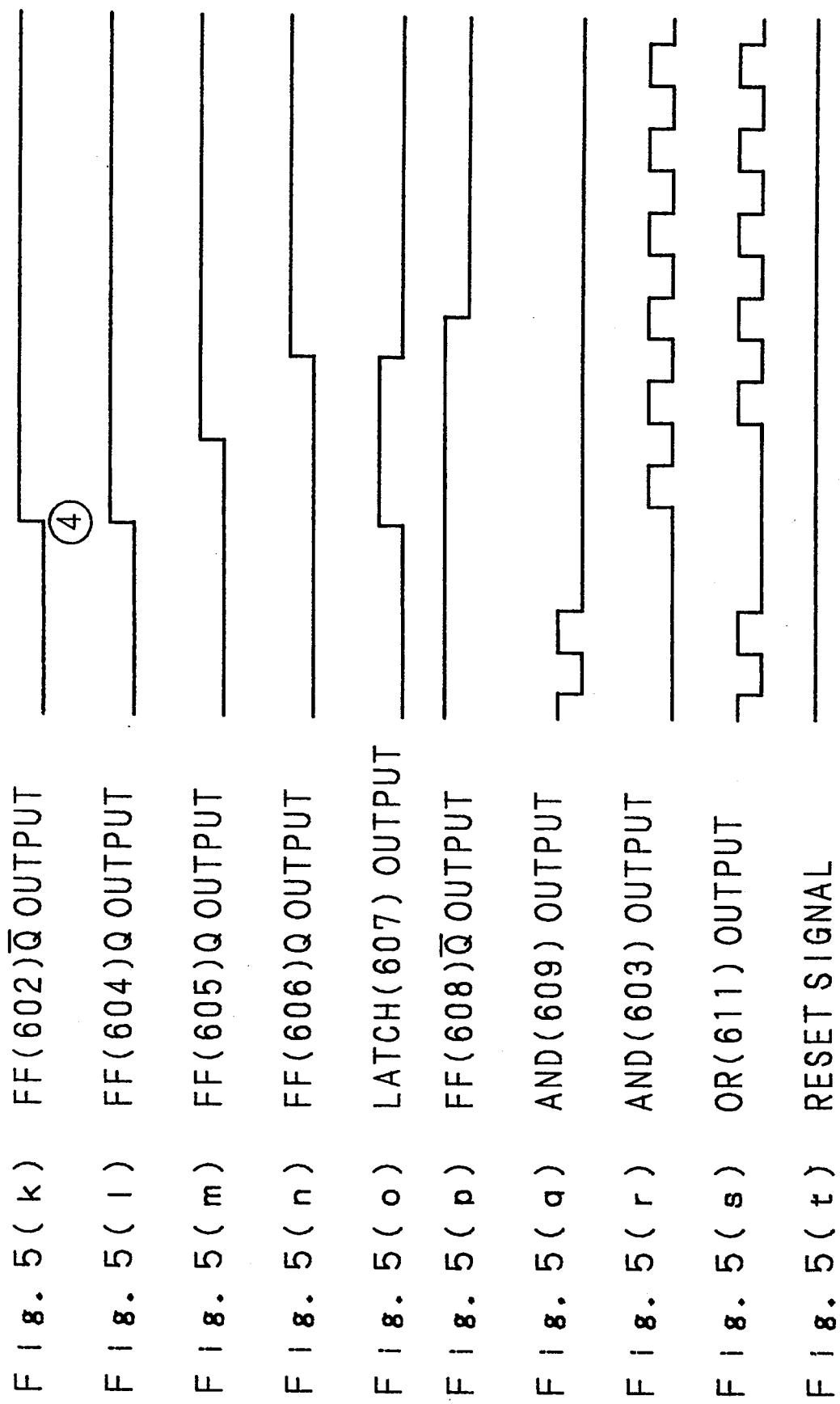

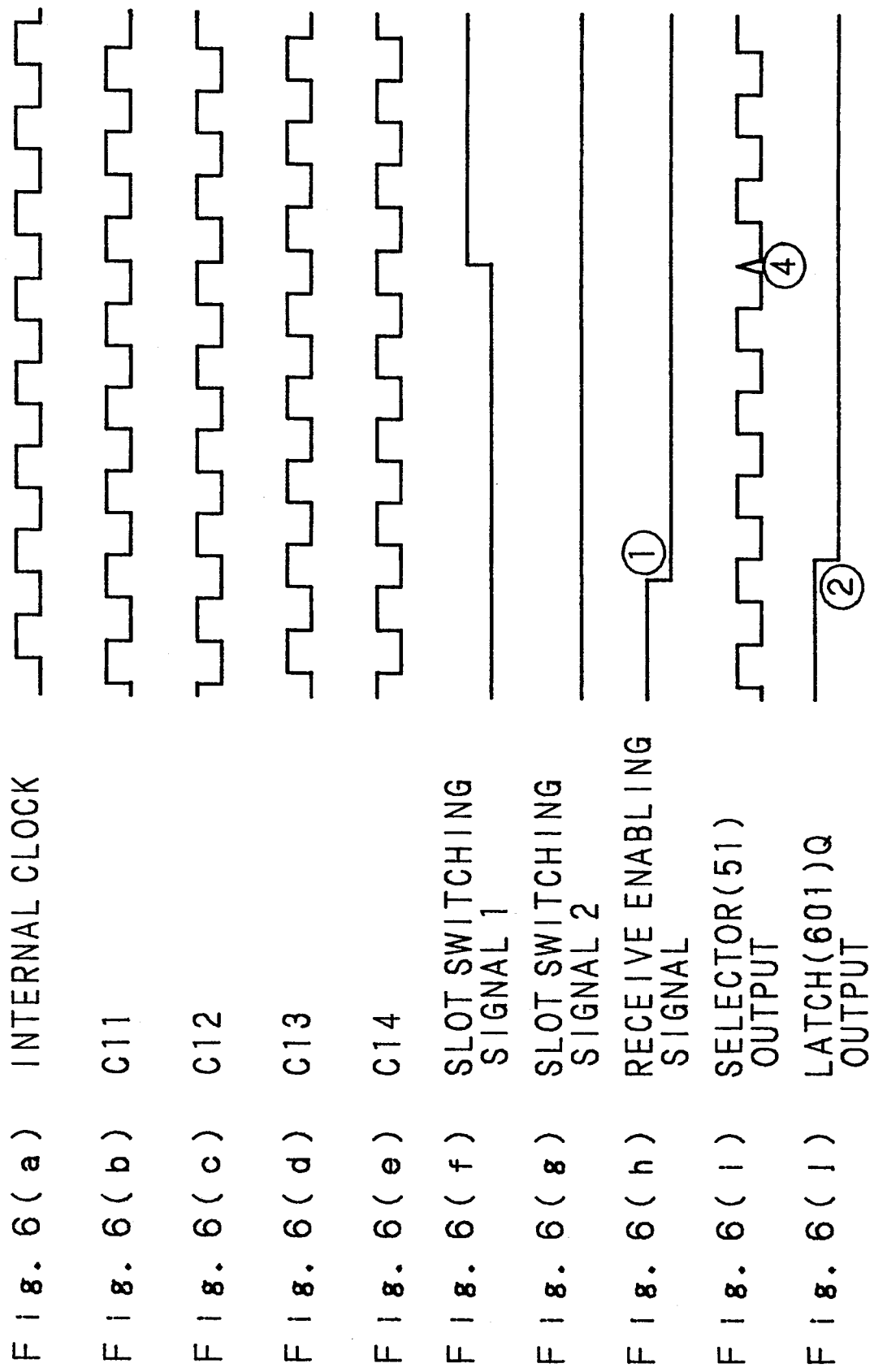

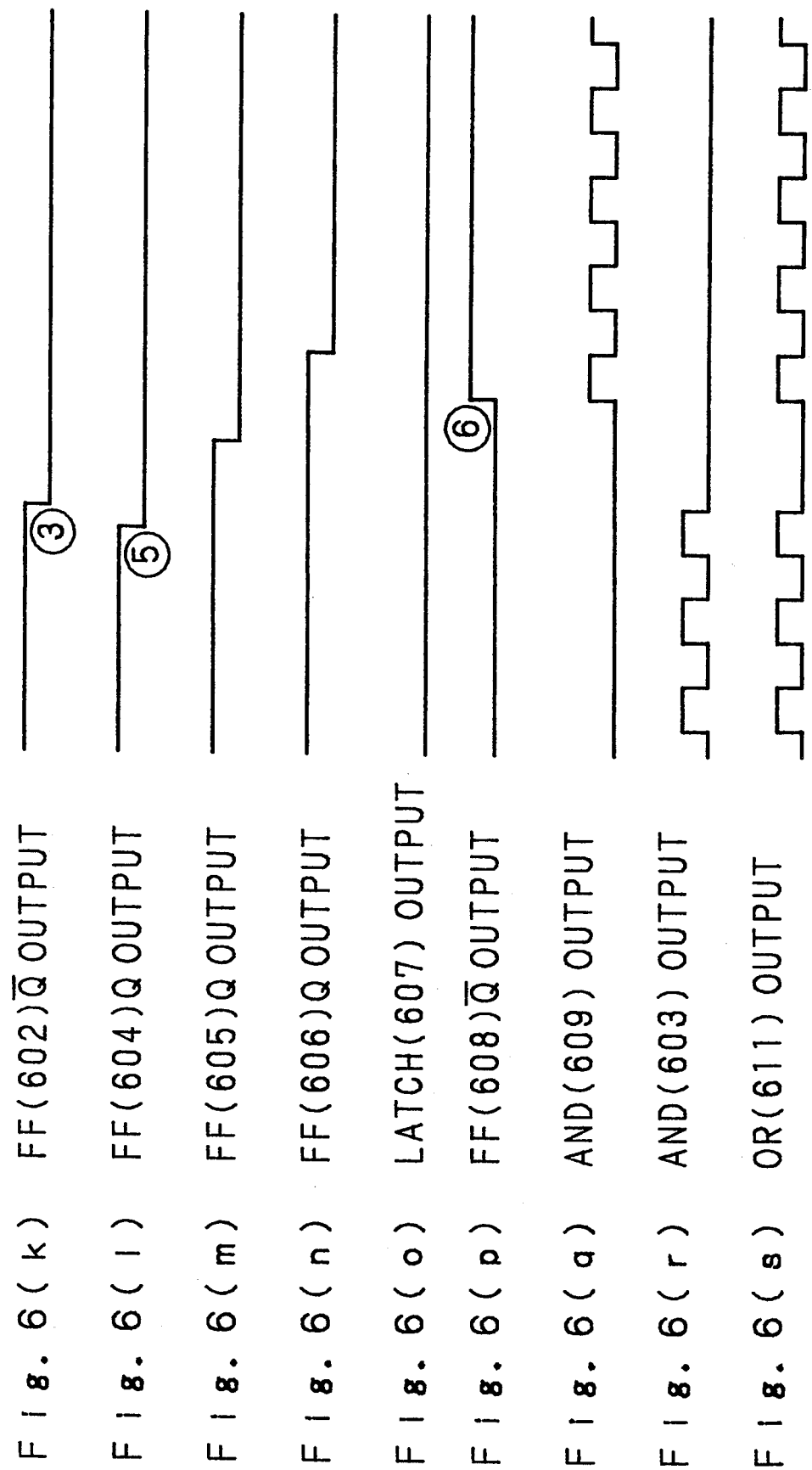

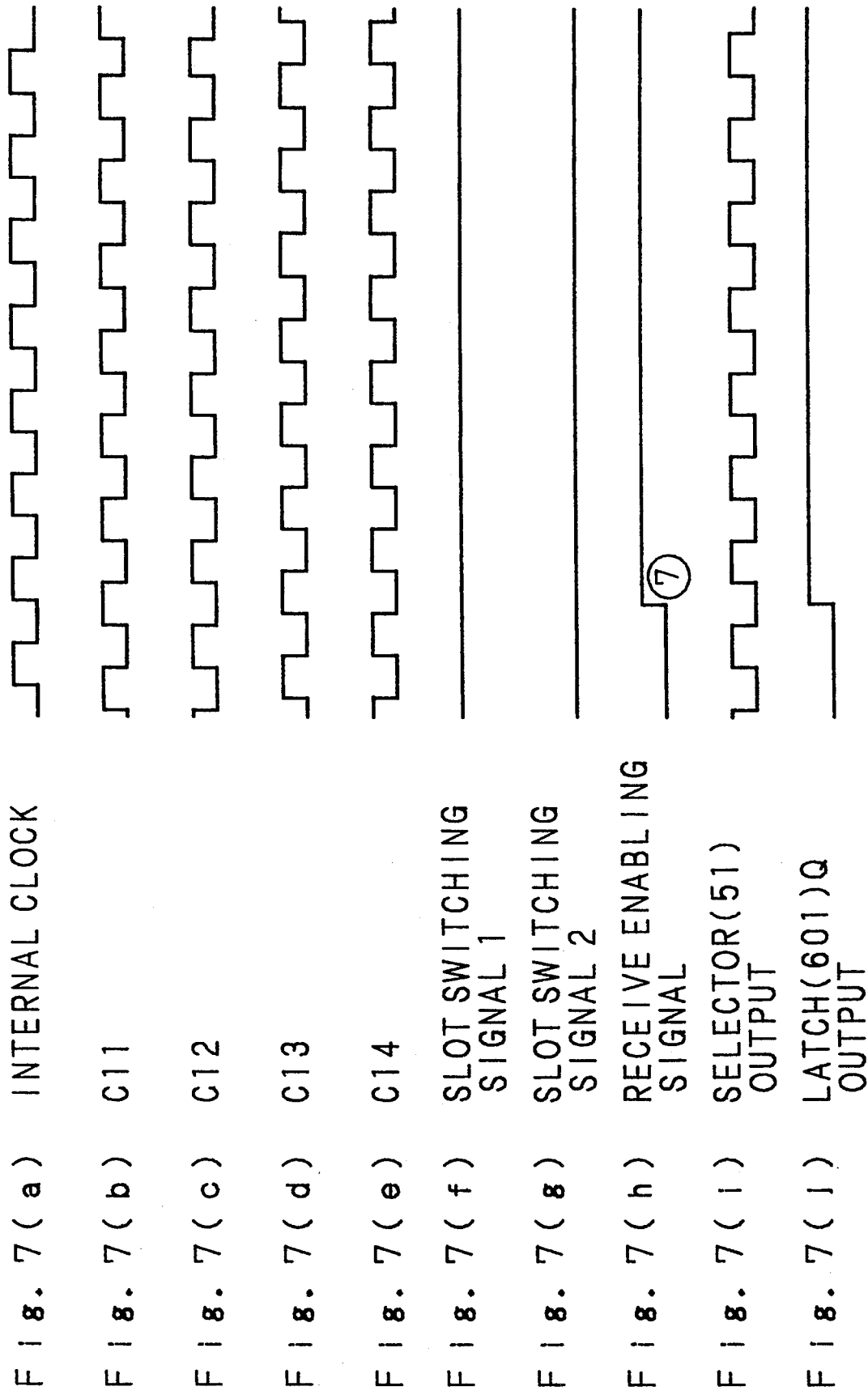

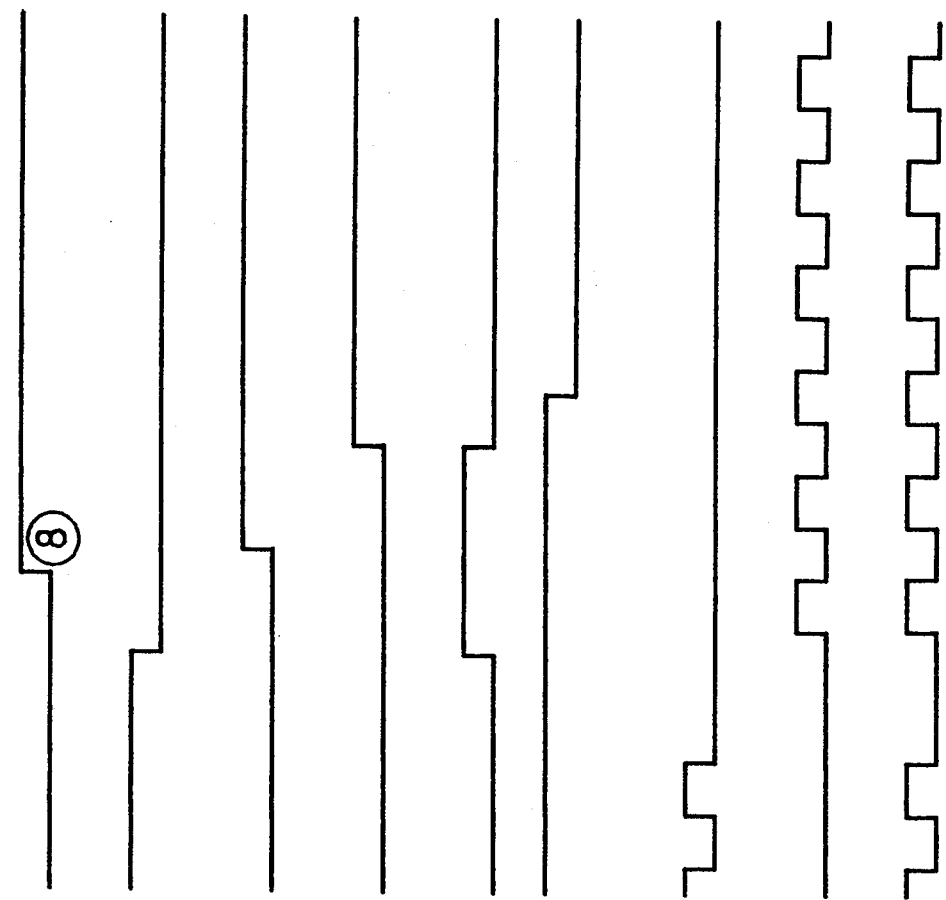

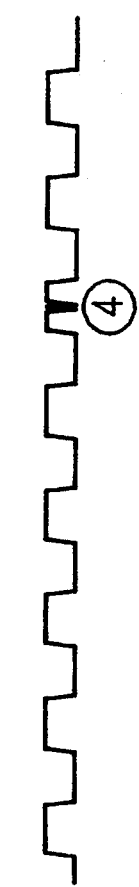
Fig. 10(a) INTERNAL CLOCK
Fig. 10(b) C10
Fig. 10(c) C20
Fig. 10(d) ANTENNA SWITCHING SIGNAL
Fig. 10(e) RECEIVE ENABLING SIGNAL
Fig. 10(f) SELECTOR(71) OUTPUT
Fig. 10(g) LATCH(601) Q OUTPUT
Fig. 10(h) FF(602) Q̄ OUTPUT
Fig. 10(i) FF(604) Q OUTPUT
Fig. 10(j) FF(605) Q OUTPUT

 Fig. 10(k) FF(606)Q OUTPUT
 Fig. 10(l) LATCH(607) OUTPUT
 Fig. 10(m) FF(608)Q̄ OUTPUT
 Fig. 10(n) AND(609) OUTPUT
 Fig. 10(o) AND(603) OUTPUT
 Fig. 10(p) OR(611) OUTPUT
 Fig. 10(q) RESET SIGNAL

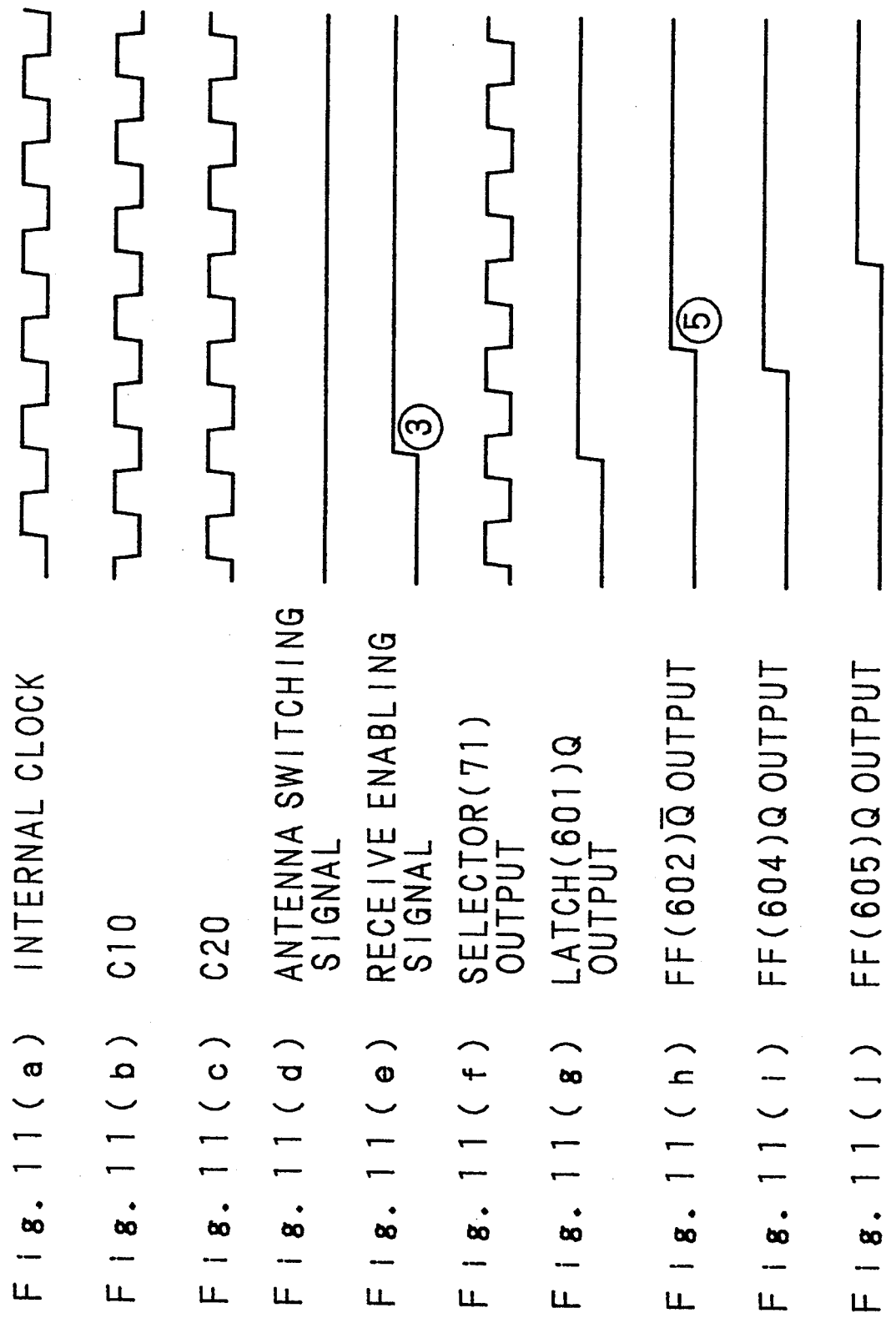

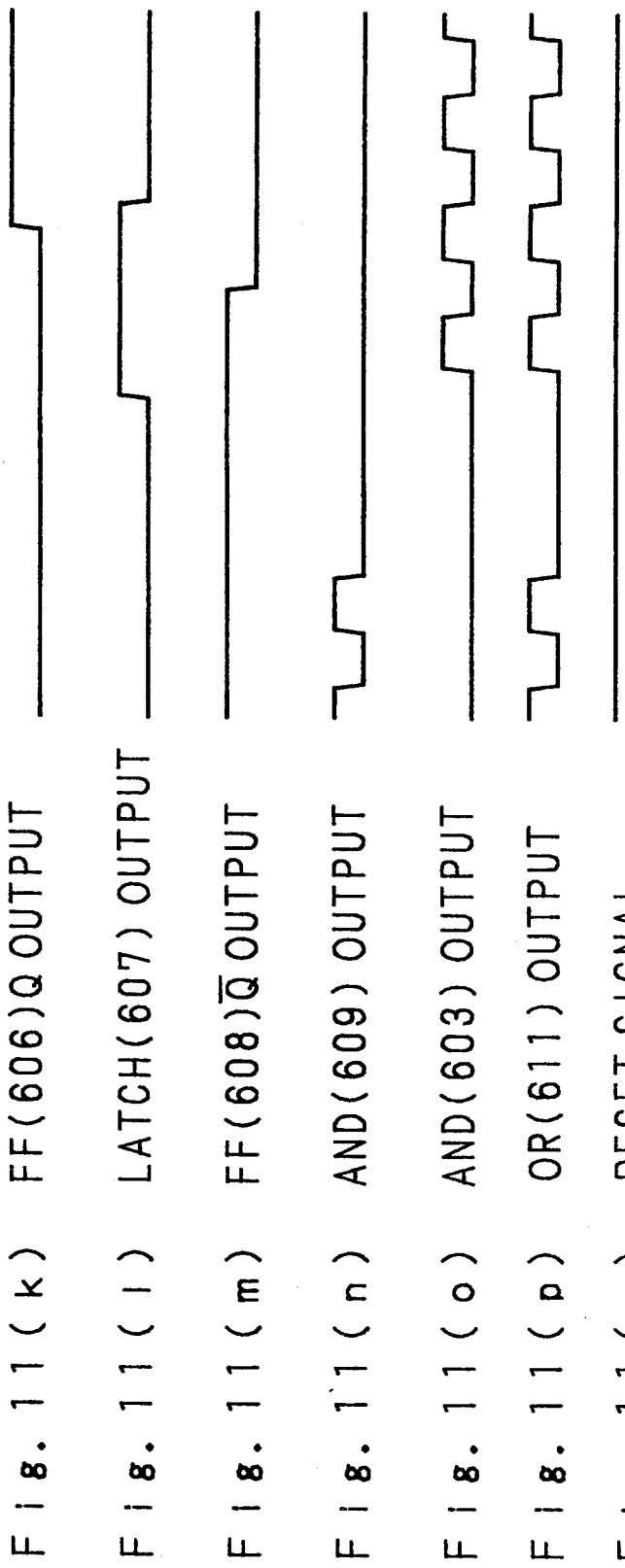

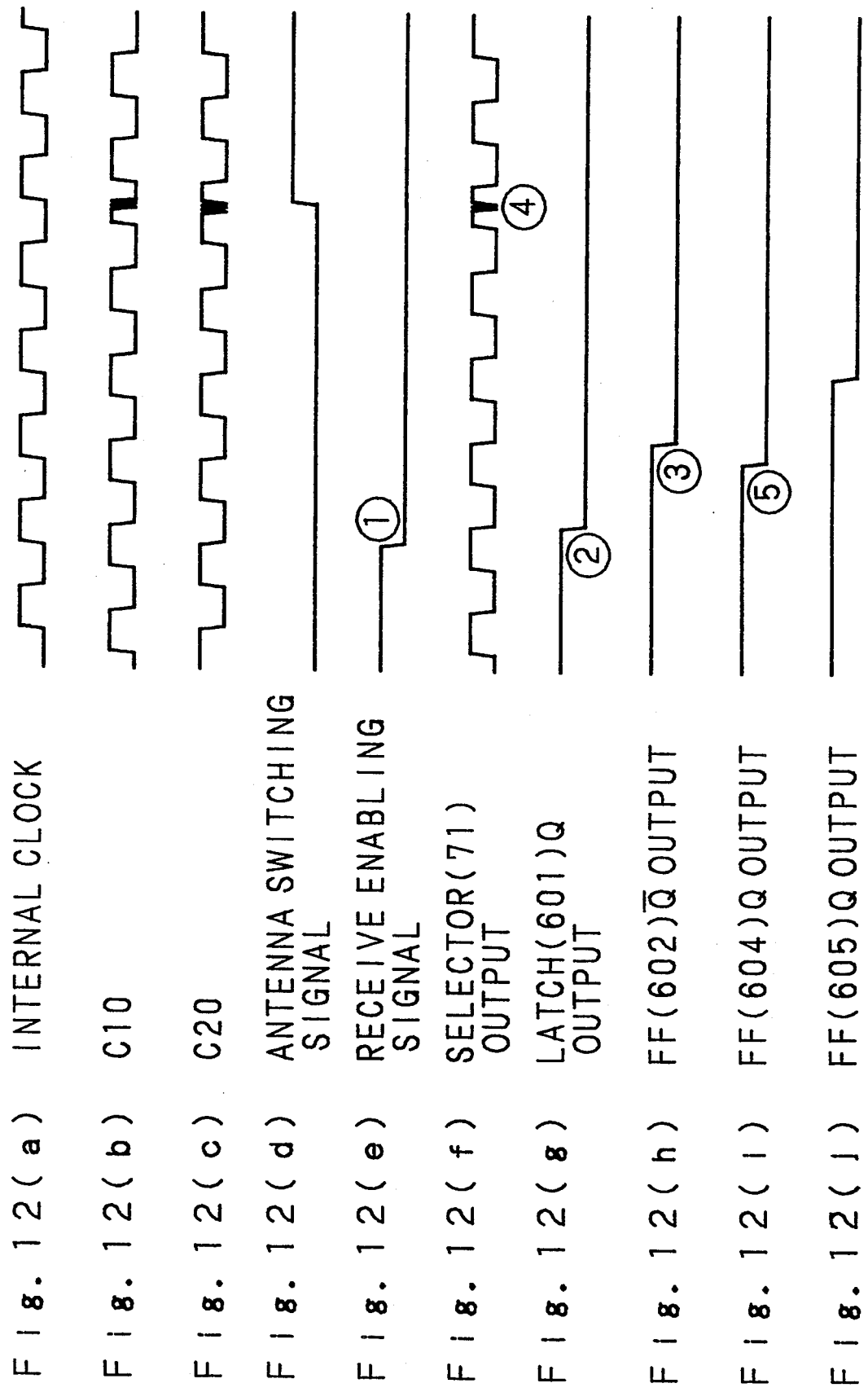

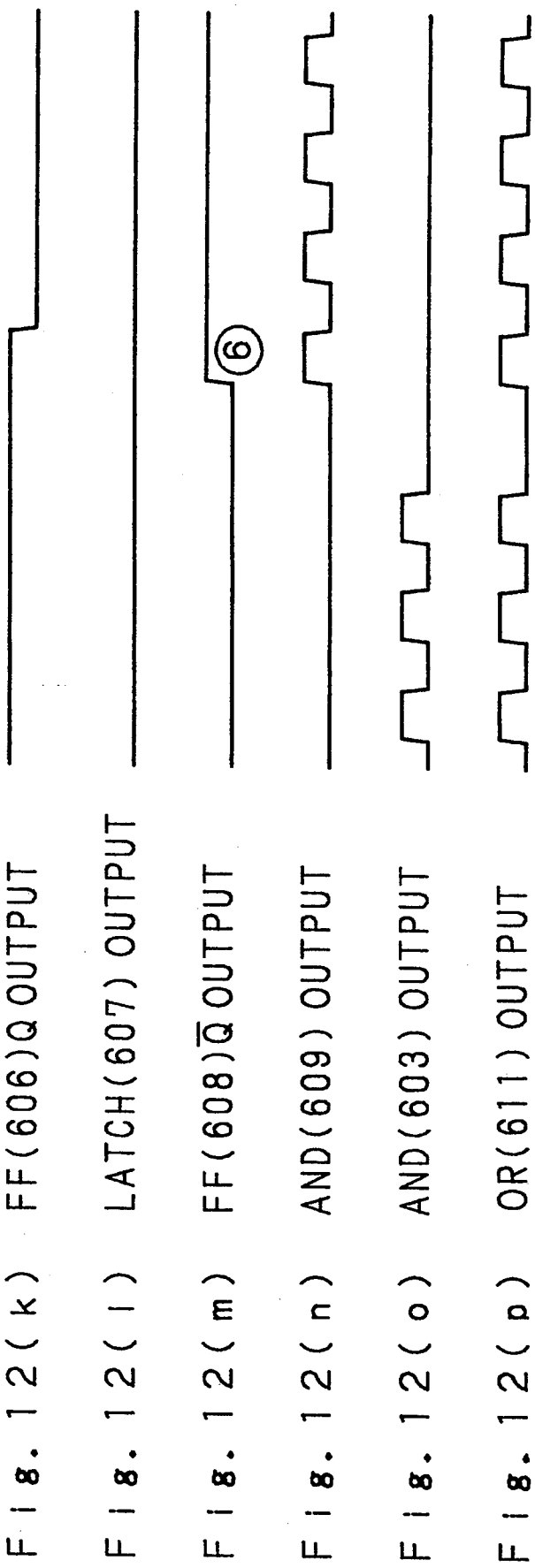

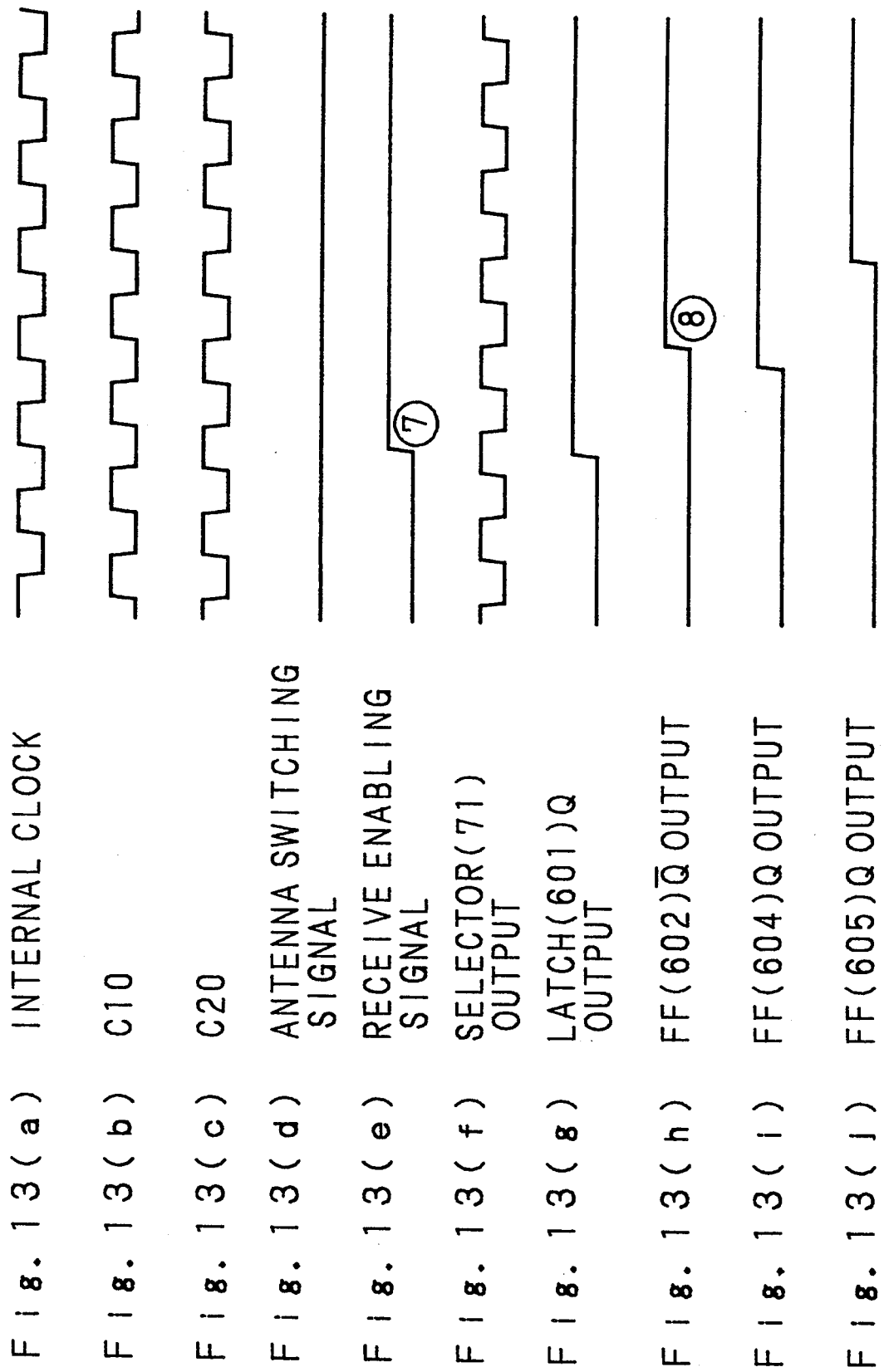

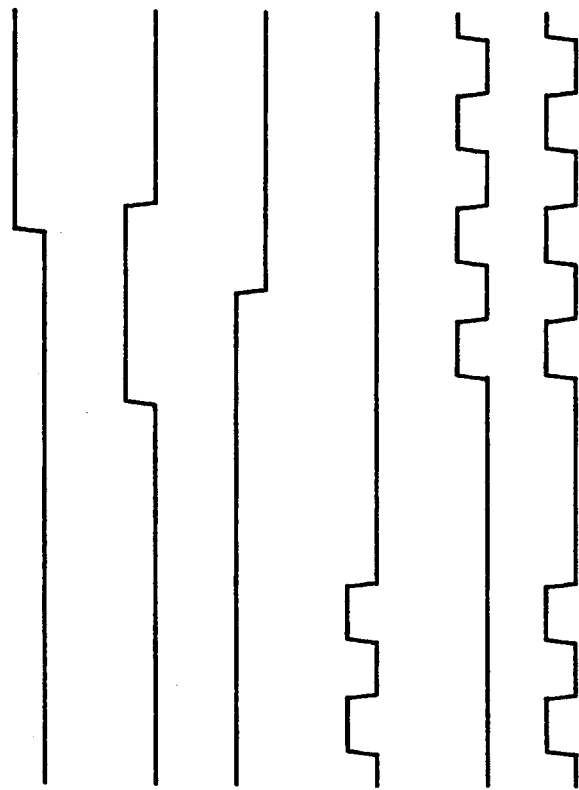

RECEIVING CIRCUIT FOR DIGITAL DATA TRANSMITTED BY WIRELESS COMMUNICATION

BACKGROUND OF THE INVENTION

1. Field of the Invention

The present invention relates to a receiving circuit for digital data transmitted by wireless.

2. Description of the Related Art

There exists such a form of digital data exchange that a plurality of mobile stations and a fixed station (base station) make bit-serial communication with each other. A receiving circuit reproduces clock signals from the received data and carries out processing of the received data such as determination thereof according to the clock signal.

In the case of communication between a plurality of stations, a time-division multiplex communication is carried out for the purpose of efficient use of time. In the time-division multiplex communication, clock signals are reproduced from the received data of each slot, then the data and the clock signals are combined and sent to the circuits in the following stage.

In addition a diversity antenna is used for the purpose of achieving more accurate data reception. The receiving circuit reproduces the clock signal by selecting the data received on the antenna which is in more favorable receiving condition.

FIGS. 1(a), (b) are block circuit diagrams illustrative of the constitution of a receiving circuit of a prior art. Radio signals received on antennas 1, 2 are inputted to demodulators 3, 4, respectively. The demodulators 3, 4 are provided with clock reproduction/data extraction circuits 31, 32, ..., 44 which are allocated to the respective slots of the received signals. The demodulators 3, 4 demodulate the received signals, and the clock reproduction/data extraction circuits 31, 32, ..., 44 extract the data of the respective slots from the demodulated signals, while reproducing a clock signal by using the bit-serial data thus extracted.

Reproduced clock signals C11, ..., C14 of the respective slots on the side of the antenna 1 and the demodulator 3 are inputted to a selector 51. And received data D11, ..., D14 of the respective slots on the side of the antenna 1 and the demodulator 3 are inputted to a selector 52.

Reproduced clock signals C21, ..., C24 of the respective slots on the side of the antenna 2 and tile demodulator 4 are inputted to a selector 53. And received data D21, ..., D24 of the respective slots on the side of the antenna 2 and the demodulator 4 are inputted to a selector 54.

A time-division timing control circuit 58 sends receive enabling signal successively to the clock reproduction/data extraction circuits 31 (41), 32 (42), 33 (43) and 34 (44) and, at the same time, sends such a signal to the selector 52 (54) that causes the selector 52 (54) to select the received data D11, ... D14 (D21, ... D24) which are outputted successively by the clock reproduction/data extraction circuits 31 (41), 32 (42), 33 (43) and 34 (44) upon receipt of the receive enabling signal, and sends such a signal to the selector 51 (53) that causes the selector 51 (53) to select the reproduced clock signals C11, ..., C14 (C21, ..., C24) which are outputted successively by the clock reproduction/data extraction circuits 31 (41), 32 (42), 33 (43) and 34 (44) upon receipt of the receive enabling signal.

Outputs from the selectors 52, 54 are sent to a selector 56 and outputs from tile selectors 51, 53 are sent to a selector 55. Selection of either the output from the selector 55 or from the selector 56 is done by selecting either a combination of the received data and the reproduced clock signal from the antenna 1 or a combination of the received data and the reproduced clock signal from the antenna 2, by means of the antenna switching signal which is outputted by a diversity controller 57 which monitors the signal intensities received on the antennas and selects the antenna which gives signals of higher intensity. Circuits that follow determine the received data using the reproduced clock signal and carry out other operations.

While selectors 51, 53, 55 switch the reproduced clock signals in such a circuit of the prior art as described above, phase difference between the slots and phase difference between the antennas cause a noise called spike, comprising an oscillation for a short duration, to appear on the output clock signals from the selectors 51, 53, 55 in synchronization with the switching timing. The spike may be mistaken as a rising edge or falling edge of the clock signal, leading to an error when determining the received data.

SUMMARY OF THE INVENTION

The present invention has been made to solve such a problem as described above, and has an object of providing a receiving circuit having a built-in clock signal generation circuit wherein the internal clock signal is interposed between the reproduced clock signals when switching the reproduced clock signals, thereby to accurately determine the received data by supplying clock signals free of spikes to the subsequent circuits.

The above and further objects and features of the invention will more fully be apparent from the following detailed description with accompanying drawings.

BRIEF DESCRIPTION OF THE DRAWINGS

FIGS. 4(a) through (t) are timing charts of the 1st embodiment of the receiving circuit of the invention;

FIGS. 5(a) through (t) are timing charts of the 1st embodiment of the receiving circuit of the invention;

FIGS. 6(a) through (s) are timing charts of the 1st embodiment of the receiving circuit of the invention;

FIGS. 7(a) through (s) are timing charts of the 1st embodiment of the receiving circuit of the invention;

FIGS. 10(a) through (q) are timing charts of the 2nd embodiment of the receiving circuit of the invention;

FIGS. 11(a) through (q) are timing charts of the 2nd embodiment of the receiving circuit of the invention;

FIGS. 12(a) through (p) are timing charts of the 2nd embodiment of the receiving circuit of the invention;

FIGS. 13(a) through (p) are timing charts of the 2nd embodiment of the receiving circuit of the invention;

DESCRIPTION OF THE PREFERRED EMBODIMENTS

The invention will now be described in detail with reference to the drawings illustrative of preferred embodiments.

Figure 1A:
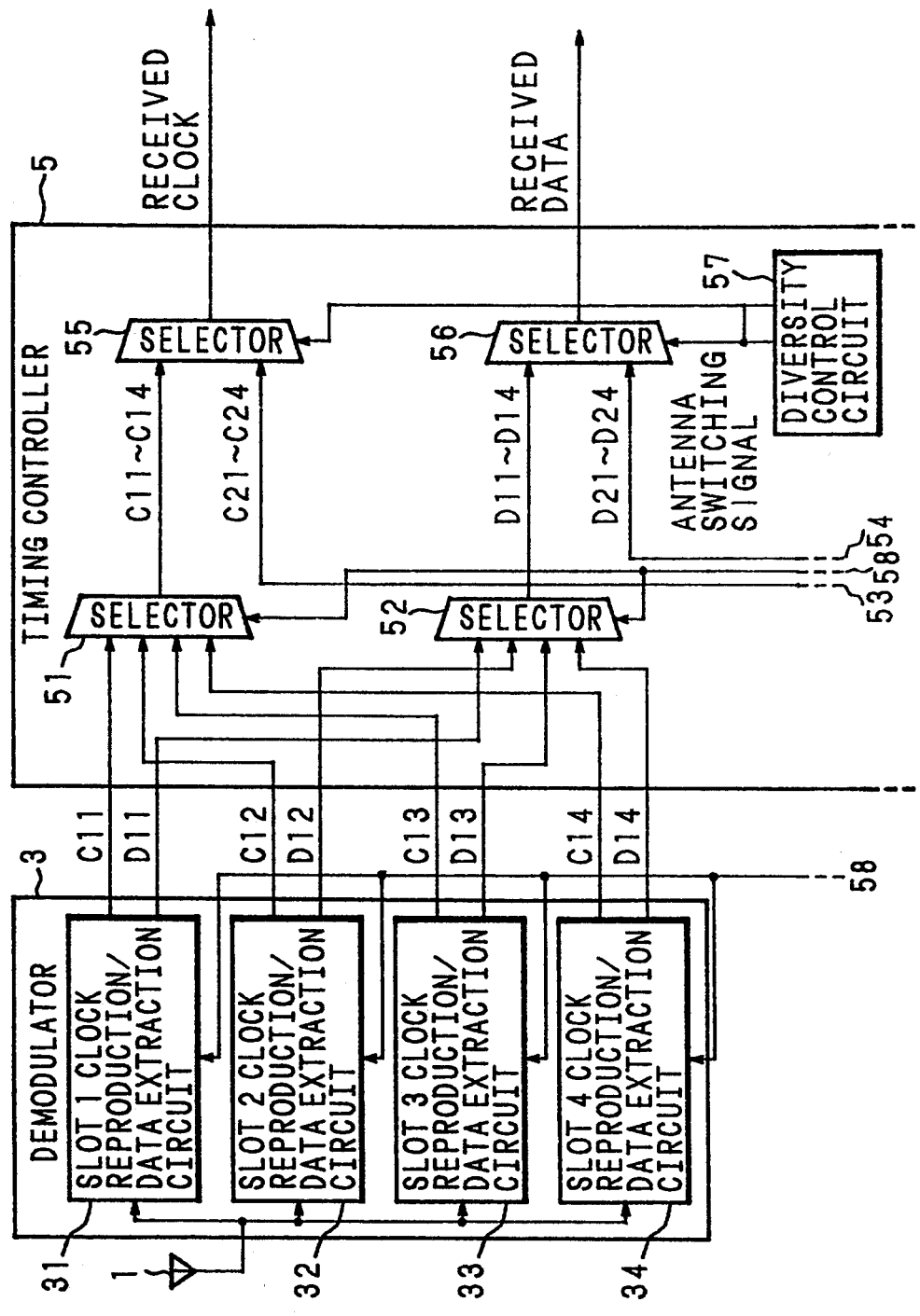
FIGS. 1(a), (b) are block circuit diagrams of a receiving circuit of a prior art.
Figure 1B:
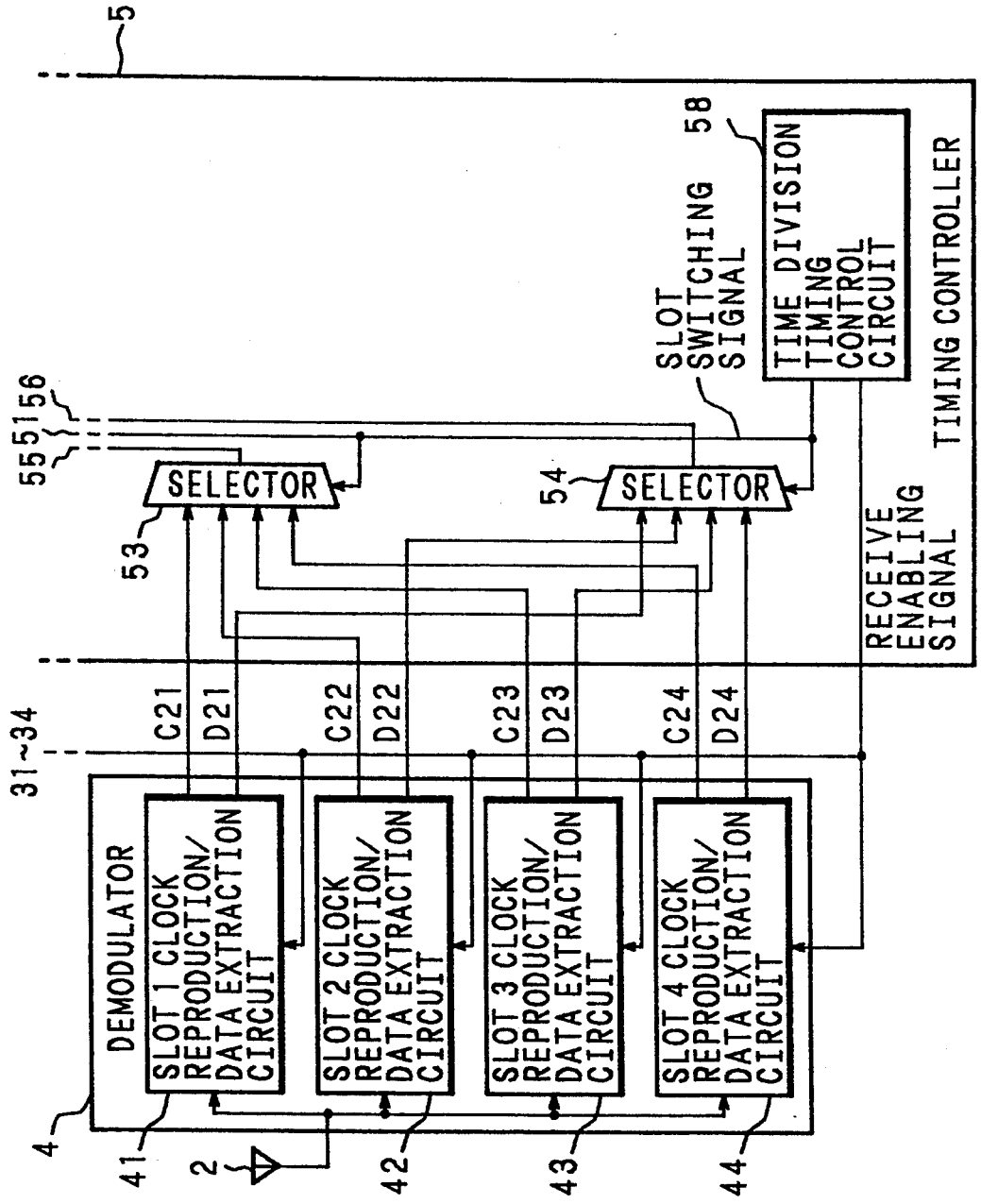
Figure 2:
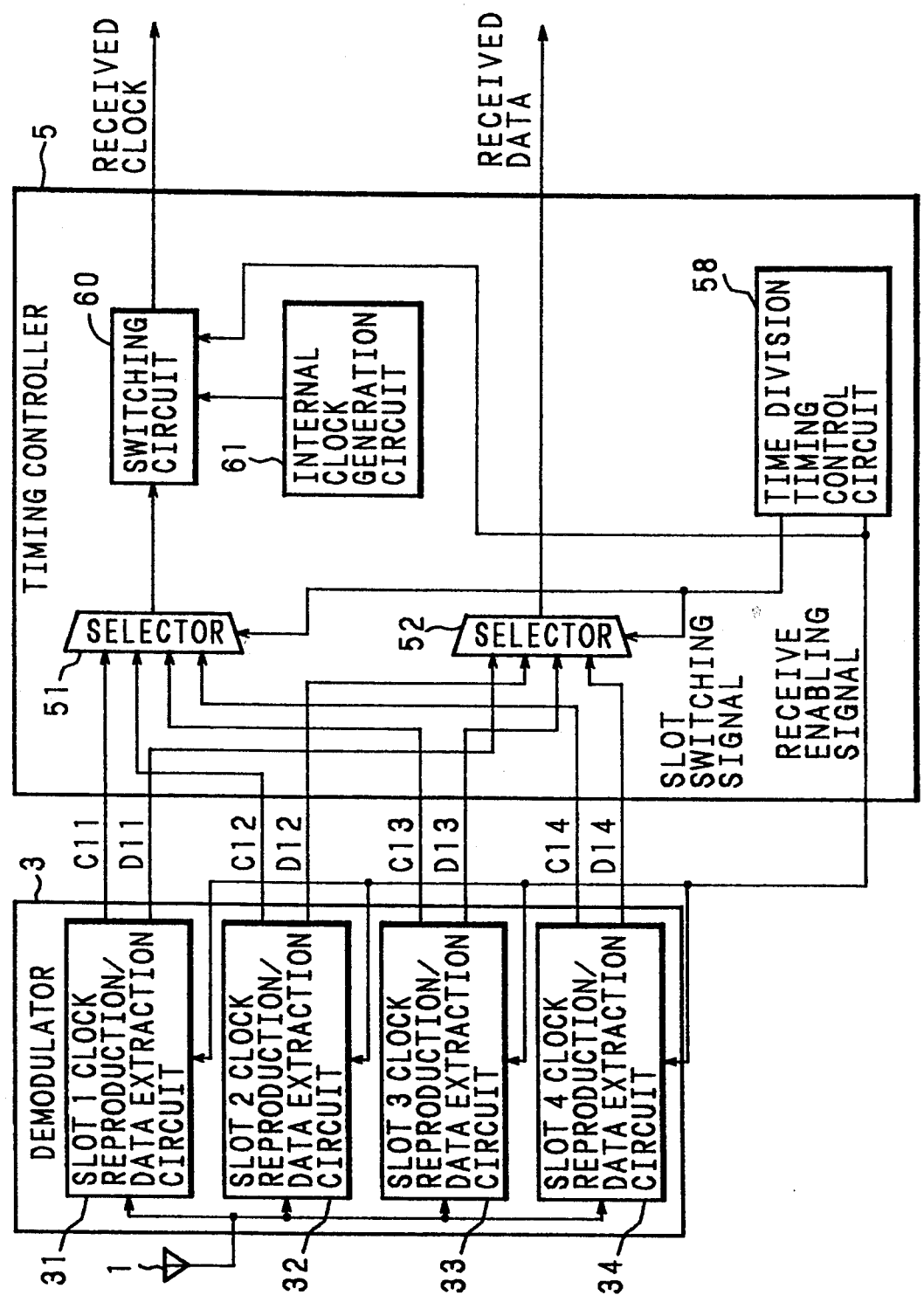
FIG. 2 is a block circuit diagram of the 1st embodiment of the receiving circuit of the invention.

FIG. 2 is a block circuit diagram of the 1st embodiment of a receiving circuit of the invention. A radio signal received on the antenna 1 is inputted to a demodulator 3. The demodulator 3 is provided with clock reproduction/data extraction circuits 31, 32, 33, 34 which are allocated to the respective slots of the received signal. The demodulator 3 demodulates the received signal, and the clock reproduction/data extraction circuits 31, 32, 33, and 34 extract data of the respective slots from the demodulated signals, while reproducing the clock signal by using the bit-serial data thus extracted.

Reproduced clock signals C11, ... C14 of the respective slots are inputted to a selector 51 of a timing controller 5. Received data D11, ... D14 of the respective slots are inputted to a selector 52 of the timing controller 5.

A time-division Liming control circuit 58 of the timing controller 5 sends receive enabling signal successively to the clock reproduction/data extraction circuits 31, 32, 33 and 34 and, at the same time, sends such a signal to the selector 52 which causes the selector 52 to select the received data D11, ... , D14 which are outputted by the clock reproduction/data extraction circuits 31, 32, 33 and 34 upon receipt of the receive enabling signal, and sends such a signal to the selector 51 which causes the selector 51 to select the reproduced clock signals C11, ... C14 which are outputted successively by the clock reproduction/data extraction circuits 31, 32, 33 and 34 upon receipt of the receive enabling signal.

An output of the selector 51 is inputted to the switching circuit 60 of the timing controller 5. An internal clock generation circuit 61 generates internal clock signals of the same waveform as that of the received clock signals, and feeds them to the switching circuit 60. The switching circuit 60 selects either of the inputs by means of the signal supplied by the time division timing controller 58. The selected clock signal and the received data selected by the selector 52 are sent to the circuit that follows.

The time division timing controller 58 causes the switching circuit 60 to switch to the internal clock generation circuit 61 before switching of the selector 51. When the received clock signal has been switched in the selector 51, the switching circuit 60 is switched to the selector 51. Although an output from the selector 51 includes spikes immediately after switching, the internal clock signal is outputted to the outside at this time and therefore no effect is given to the outside.

Figure 3:
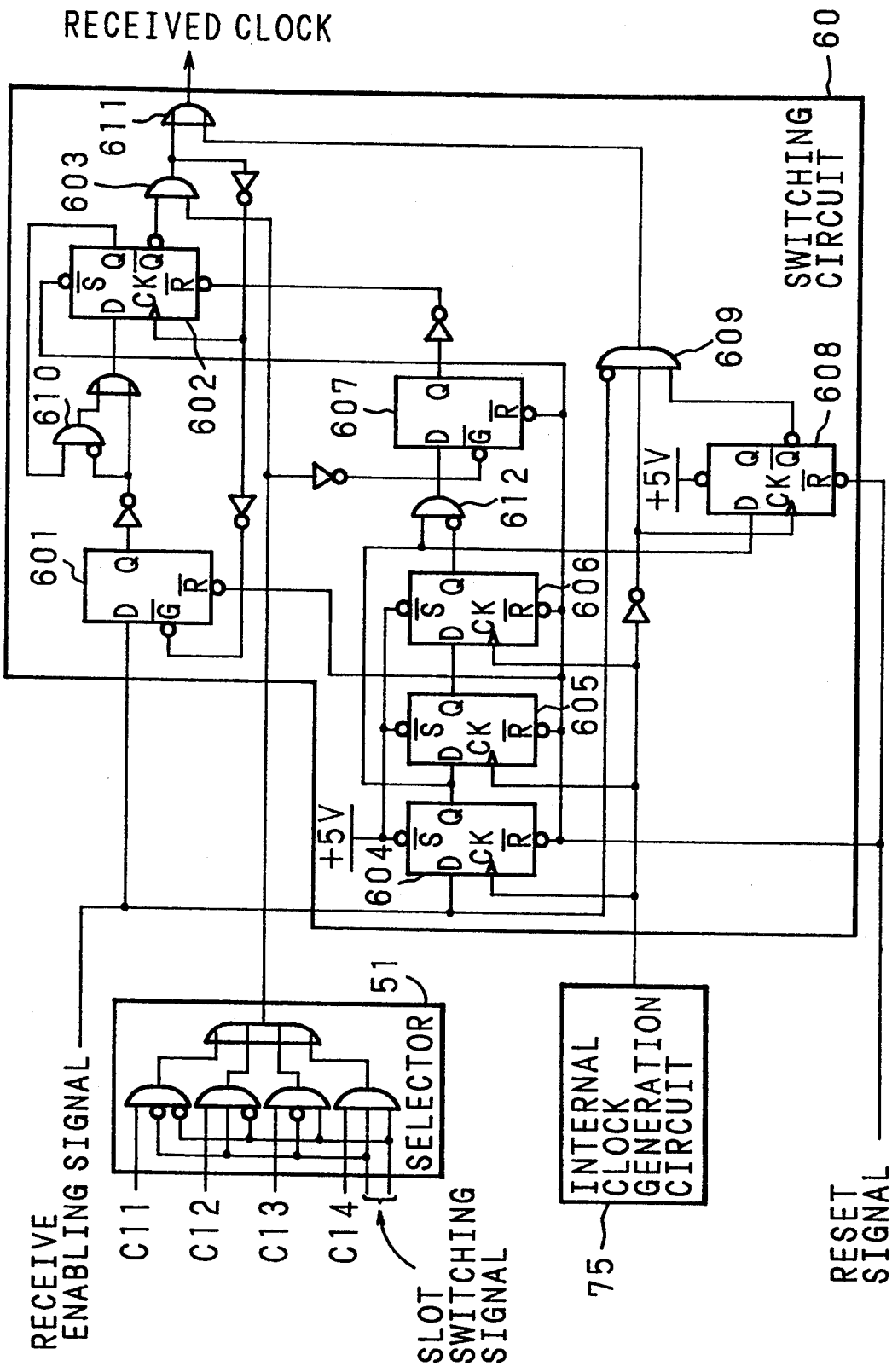
FIG. 3 is a circuit diagram of a timing controller of the 1st embodiment of the receiving circuit of the invention.

FIG. 3 is a block circuit diagram of a key section of the timing controller 5 of the receiving circuit shown in FIG. 2. The selector 51 comprises four AND gates and four input OR gates which receive the outputs of the AND gates as inputs thereof. The AND gates receive the clock signals C11, ... , C14 reproduced in the demodulator 3. A 2-bit slot switching signal which is outputted from the time-division timing control circuit 58 is inputted to the AND gates to supply one of the AND gate outputs to the OR gate.

The receive enabling signal which is outputted by the time division timing control circuit 58 is inputted to a latch circuit 601, a flip-flop 604 and a 3-input AND gate 609. A Q output of the latch circuit 601 is inputted to a flip-flop 602 via an inverter and the OR gate. A Q output of the flip-flop 602 is supplied to an AND gate 610 as one of the inputs thereof. The AND gate 610 receives the Q output of the latch circuit 601 inverted as another input (L active) thereof. The $\overline{Q}$ output of the flip-flop 602 is supplied to an AND gate 603 as one input thereof, and receives the selector 51 output as another input. An output of the AND gate 603 is outputted via an OR gate 611 to the outside of the switching circuit 60 as received clock signal and, at the same time, fed to the clock terminal of the flip-flop 602 via one inverter and to the $\overline{G}$ terminal of the latch circuit 601 via two inverters.

The flip-flops 604, 605, 606 are connected in cascade and Q outputs of the flip-flops 604, 606 are inputted to an AND gate 612. The flip-flop 606 side input is L active. Output of the AND gate 612 is inputted to a latch circuit 607. A Q output of the latch circuit 607 is fed to the reset terminal $\overline{R}$ of the flip-flop 602 via an inverter. The $\overline{G}$ terminal of the latch circuit 607 receives an inverted output of the selector 51.

An internal clock signal which is outputted by an internal clock generation circuit 75 is fed to the clock terminals CK of the flip-flops 604, 605, 606, and is inputted to the clock terminals CK of an AND gate 609 and of a flip-flop 608 via an inverter. A Q output of the flip-flop 605 is inputted to the flip-flop 608, and a $\overline{Q}$ output of the flip-flop 608 is inputted to the AND gate 609. An output of the AND gate 609 is inputted to the OR gate 611.

A reset signal given from a circuit not shown in the drawing is inputted to the direct set terminal $\overline{S}$ of the flip-flop 602, and to all the direct reset terminals R of other flip-flops and latch circuits.

Operation of such a circuit will be described below according to the timing charts of FIG. 4 through FIG. 7. FIG. 4 and FIG. 5 show the initial operations. At first, because a receive enabling signal (FIG. 4(h), FIG. 5(h)) is "L" and a reset signal (FIG. 4(t), FIG. 5(t)) is "L", the AND gate 609 opens to output the internal clock signal (FIG. 4(a), FIG. 5(a)) as the received clock signal (FIG. 4(q)(s), FIG. 5(q)(s)). Because a slot switching signal (FIG. 4(f)(g), FIG. 5(f)(g)) is "00" at this time, the selector 51 selects the reproduced clock signal C11 (FIG. 4(i), FIG. 5(i)). When the reset signal turns to "H" (①), all flip-flops and the latch circuits are released from the reset state. When the slot switching signal turns to "01" (②), the selector 51 switches the output from the reproduced clock signal C11 to the reproduced clock signal C12, with spikes (⑤) appearing because of the phase difference between these clock signals. However, because the receive enabling signal remains "L", the internal clock signal is outputted to the outside, and therefore the spikes are not transmitted to the outside.

When the receive enabling signal turns to "H" (③), the AND gate 609 closes and the output of the OR gate 611 remains at "L" level. On the other hand, the receive enabling signal is latched in the flip-flop 604 with the Q output thereof being set to "H". At this-time, because the Q output of the flip-flop 606 is "L", the latch circuit 607 latches "H" level so that the flip-flop 602 is directly reset by the Q output of the latch circuit 607 shown in FIG. 4(o) and FIG. 5(o), and the $\overline{Q}$ output of the flip-flop 602 turns to "H" ((4)) to open the AND gate 603, thereby causing the output C12 of the selector 51 to be outputted to the outside.

When the slot switching signal changes from "00" to "10" as shown in FIGS. 6(f)(g) and FIGS. 7(f)(g), the receive enabling signal is kept at "L" level ((1)-(7)) for a period of several clock intervals including the time of change (FIG. 6(h), FIG. 7(h)).

The change of the receive enabling signal to "L" ((1)) is latched in the latch circuit 601 by the output clock signal of the AND gate 603 (FIG. 6(r), FIG. 7(r)), namely the reproduced clock signal C11 given by the selector 51 in this case, and is then latched in the flip-flop 602. This causes the AND gate 603 to close so that the output of the selector 51 is not outputted to the outside. Although spikes ((4)) appear in the selector 51 output (FIG. 6(i), FIG. 7(i)) when the slot switching signal changes, the spikes are masked.

The change of the receive enabling signal to "L" is also latched in the flip-flop 604 by the internal clock. With a delay of one period, the flip-flop 605 latches the Q output of the flip-flop 604. The flip-flop 608, because it operates on the inverted internal clock signal as the clock signal, latches the Q output of the flip-flop 604 with another delay of half a period. This causes the $\overline{Q}$ output of the flip-flop 608 to turn to "H" ((1)) as shown in FIG. 6(p), FIG. 7(p), and causes the AND gate 609 to open, so that the internal clock passes the AND gate 609 and the OR gate 611 to be outputted to the outside (FIGS. 6(q)(s), FIGS. 7(q)(s)).

When the receive enabling signal changes to "H" ((7)), the AND gate 609 closes so that the internal clock does not pass the AND gate 609 and the OR gate 611 and is not outputted to the outside. On the other hand, the receive enabling signal is latched in the flip-flop 604 and its Q output turns to "H". At this time, because the Q output of the flip-flop 605 is "L", the latch circuit 607 latches "H" level so that the flip-flop 602 is directly reset by the $\overline{Q}$ output of the latch circuit 607 shown in FIG. 6(o) and FIG. 7(o) and the Q output of the flip-flop 602 turns to "H" to open the AND gate 603, thereby causing the output C12 of the selector 51 to be outputted to the outside.

Figure 8:
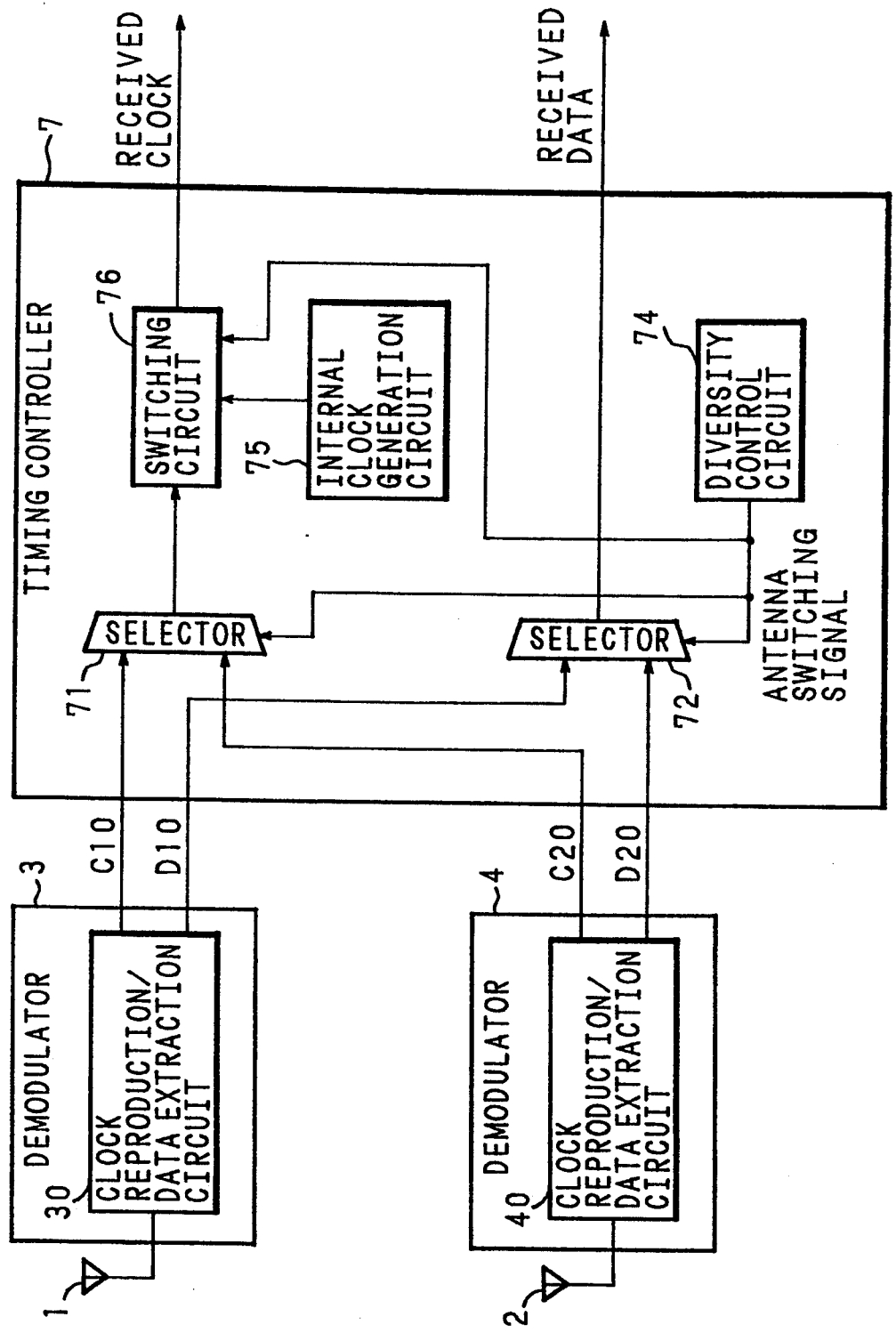
FIG. 8 is a block circuit diagram of the 2nd embodiment of the receiving circuit of the invention.

FIG. 8 is a block circuit diagram illustrating the second embodiment of the receiving circuit of the invention. Radio signals received on the antennas 1, 2 are inputted to the demodulators 3, 4 respectively. The demodulators 3, 4 demodulate the received signals and clock reproduction/data extraction circuits 30, 40 extract data from the demodulated signals and reproduce the clock signals by using tile extracted bit-serial data.

A reproduced clock signal C10 on at the side of antenna 1, the demodulator 3 and a reproduced clock signal C20 on the antenna 2, at the side of demodulator 4 are inputted to a selector 71. Received data D10 on at the side of antenna 1, the demodulator 3 side and received data D20 on the antenna 2, the demodulator 4 side are inputted to a selector 72.

A diversity control circuit 74 monitors the intensities of the signals received on the antennas 1, 2, and sends an antenna switching signal which selects one of the combinations of higher intensity from either the combination of the received data and the reproduced clock signal of the antenna 1 side or the combination of the received data and the reproduced clock signal of the antenna 2 side to the selectors 71, 72. The selector 71 output is inputted to a switching circuit 76 of a timing controller 7. The internal clock generation circuit 75 generates and outputs the internal clock signal having the same waveform as that of the reproduced clock, and the internal clock signal is inputted to the switching circuit 76. The switching circuit 76 selects one of the inputs by means of the signal given from the diversity control circuit 74. The selected signal and the received data selected by the selector 72 are outputted to the following circuit.

The diversity control circuit 74 causes the switching circuit 76 to switch to the internal clock generation circuit 75 before the switching of the selector 71, and causes the switching circuit 76 to switch to the selector 71 after the switching of the received clock signals in the selector 71. Although the output from the selector 71 includes spikes immediately after switching, the internal clock signal is outputted to the outside at this time and no effect is given to the outside.

Figure 9:
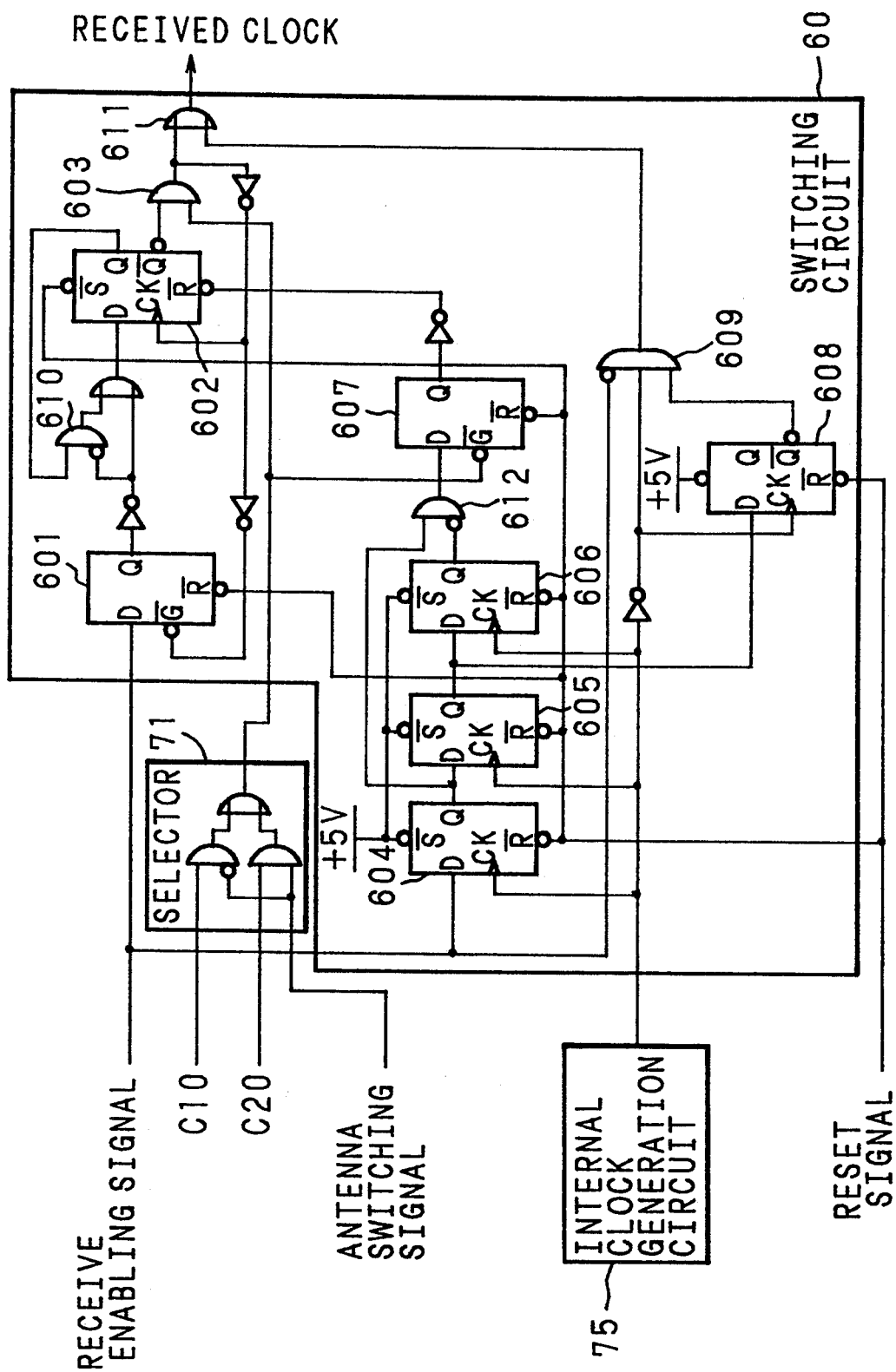
FIG. 9 is a circuit diagram of the timing controller of the 2nd embodiment of the receiving circuit of the invention.

FIG. 9 is a block circuit diagram of a key section of a timing controller 5 of the receiving circuit shown in FIG. 8. The selector 71 comprises two AND gates and an OR gate which receives the outputs of the AND gates as the inputs thereof. The AND gates receive the reproduced clock signals C10, C20 which are reproduced by the demodulators 3, 4, respectively. An antenna switching signal which is outputted by the diversity control circuit 74 is inputted to the AND gates so that the output of one of the AND gates is inputted to the OR gate. The selector 71 output is given to the AND gate 603 and the G terminal of the latch circuit 607. Because the constitution is similar to the circuit shown in FIG. 3 in other respects, description thereof will be omitted with identical symbols being given to the corresponding parts.

The operation of the above-mentioned circuit will be described below with reference to the timing charts of FIG. 10 through FIG. 13. FIG. 10 and FIG. 11 show the initial operations. At first, because the receive enabling signal (FIG. 10(e), FIG. 11(e)) is "L" and the reset signal (FIG. 10(q), FIG. 11(q)) is "L", the AND gate 609 opens to output the internal clock signal (FIG. 10(a), FIG. 11(a)) as the received clock signal (FIGS. 10(n)(p), FIGS. 11(n)(p)). Because the antenna switching signal (FIG. 10(d), FIG. 11(d) is "L" at this time, the selector 71 selects the reproduced clock signal C10 (FIG. 10(f), FIG. 11(f)). When the reset signal becomes "H" ((1))), all flip-flops and latch circuits are released from the reset state. When the antenna switching signal turns to "H" ((2)), the selector 71 switches the output from the reproduced clock signal C10 to the reproduced clock signal C20, with spikes ((4))) appearing because of the phase difference between these clock signals. However, because the receive enabling signal remains "L", the internal clock signal is outputted to the outside and therefore the spikes are not transmitted to the outside.

When the receive enabling signal turns to "H" ((3)), the AND gate 609 closes and the output of the OR gate 611 remains at "L" level. On the other hand, the receive enabling signal is latched by the flip-flop 604 with the Q output thereof being set to "H". At this time, because the Q output of the flip-flop 606 is "L", the latch circuit 607 latches "H" level so that the flip-flop 602 is directly reset by the $\overline{Q}$ output of the latch circuit 607 shown in FIG. 10(*l*) and FIG. 11(*l*), and the Q̄ output of the flip-flop 602 turns to "H" ((5)) to open the AND gate 603, thereby causing the output C20 of the selector 71 to be outputted to the outside.

When the antenna switching signal changes from "L" to "H" as shown in FIG. 12(*d*) and FIG. 13(*d*), the receive enabling signal is kept at "L" level ((1)-(7)) for a period of several clock intervals including the time of change (FIG. 12(*e*), FIG. 13(*e*)).

Change of the receive enabling signal to "L" ((1)) is latched ((2)) in the latch circuit 601 by the output clock of the AND gate 603 (FIG. 12(*o*), FIG. 13(*o*)), namely the reproduced clock C10 given by the selector 71 in this case, and is then latched ((3)) by the flip-flop 602. This causes the AND gate 603 to close so that the output of the selector 71 is not outputted to the outside. Although spikes ((4)) appear in the selector 71 output (FIG. 12(*f*), FIG. 13(*f*)) when the antenna switching signal changes, spikes are masked.

Change of the receive enabling signal to "L" is also latched ((4)) in the flip-flop 604 by the internal clock signal. With a delay of one period, the flip-flop 605 latches the Q output of the flip-flop 604. The flip-flop 608, because it operates on the inverted internal clock as the clock signal, latches the Q output of the flip-flop 604 with additional delay of half a period. This causes the Q̄ output of the flip-flop 608 to turn to "H" ((6)) as shown in FIG. 12(*p*), FIG. 13(*p*) and the AND gate 609 to open, so that the internal clock signal passes the AND gate 609 and the OR gate 611 to be outputted to the outside (FIGS. 12(*n*)(*p*), FIGS. 13(*n*)(*p*)).

When the receive enabling signal changes to "H" ((7)), the AND gate 609 closes so that the internal clock signal does not pass the AND gate 609 and the OR gate 611 and is not outputted to the outside. On the other hand, the receive enabling signal is latched in the flip-flop 604 and its Q output turns to "H" ((8)). At this time, because the Q output of the flip-flop 606 is "L", the latch circuit 607 latches "H" level so that the flip-flop 602 is directly reset by the Q output of the latch circuit 607 shown in FIG. 12(*l*) and FIG. 13(*l*) and the Q̄ output of the flip-flop 602 turns to "H" ((8)) to open the AND gate 603, thereby causing the output C20 of the selector 71 to be outputted to the outside.

Figure 14A:
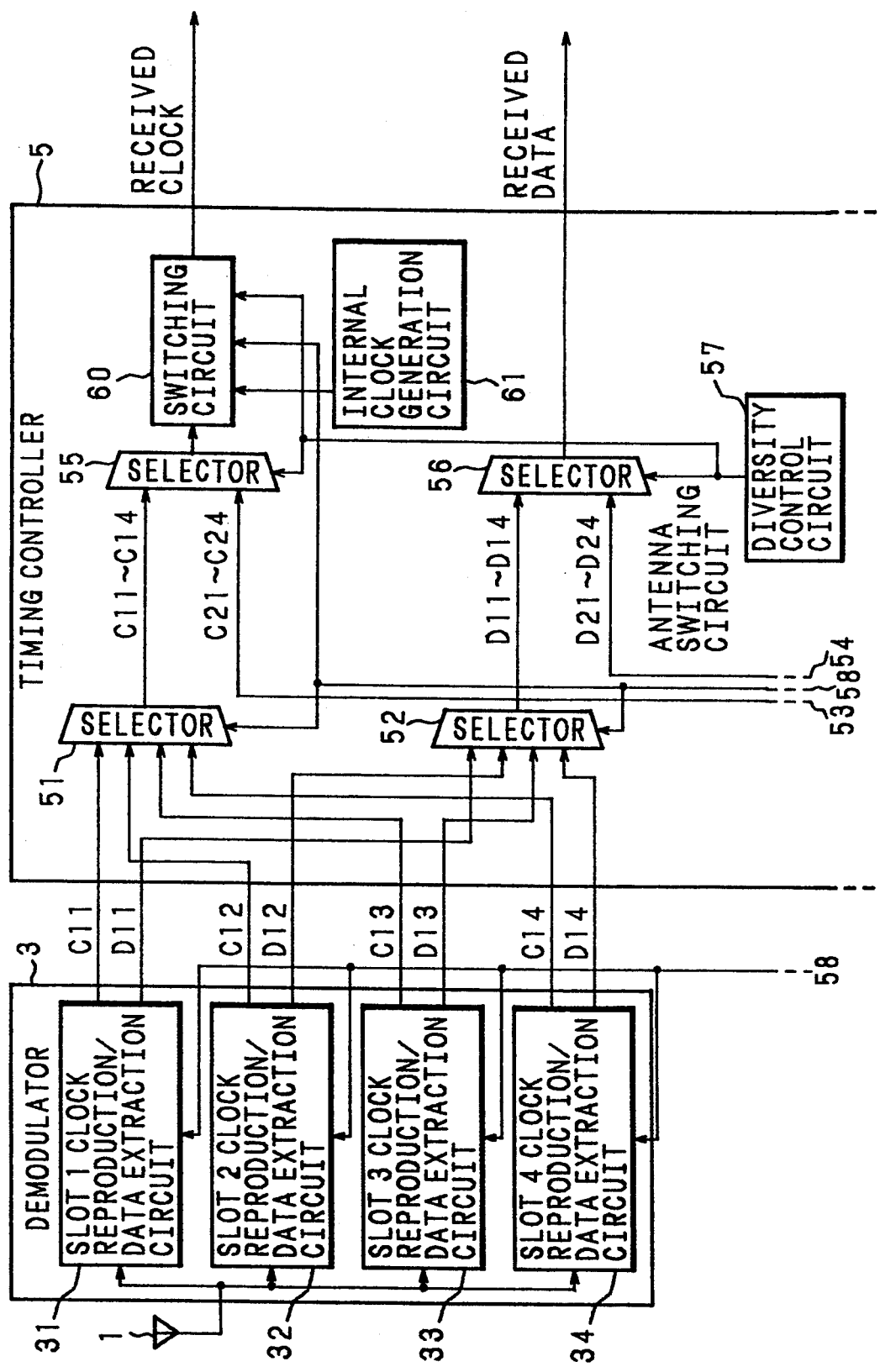
FIGS. 14(a), (b) are block circuit diagrams of the 3rd embodiment of the receiving circuit of the invention.
Figure 14B:
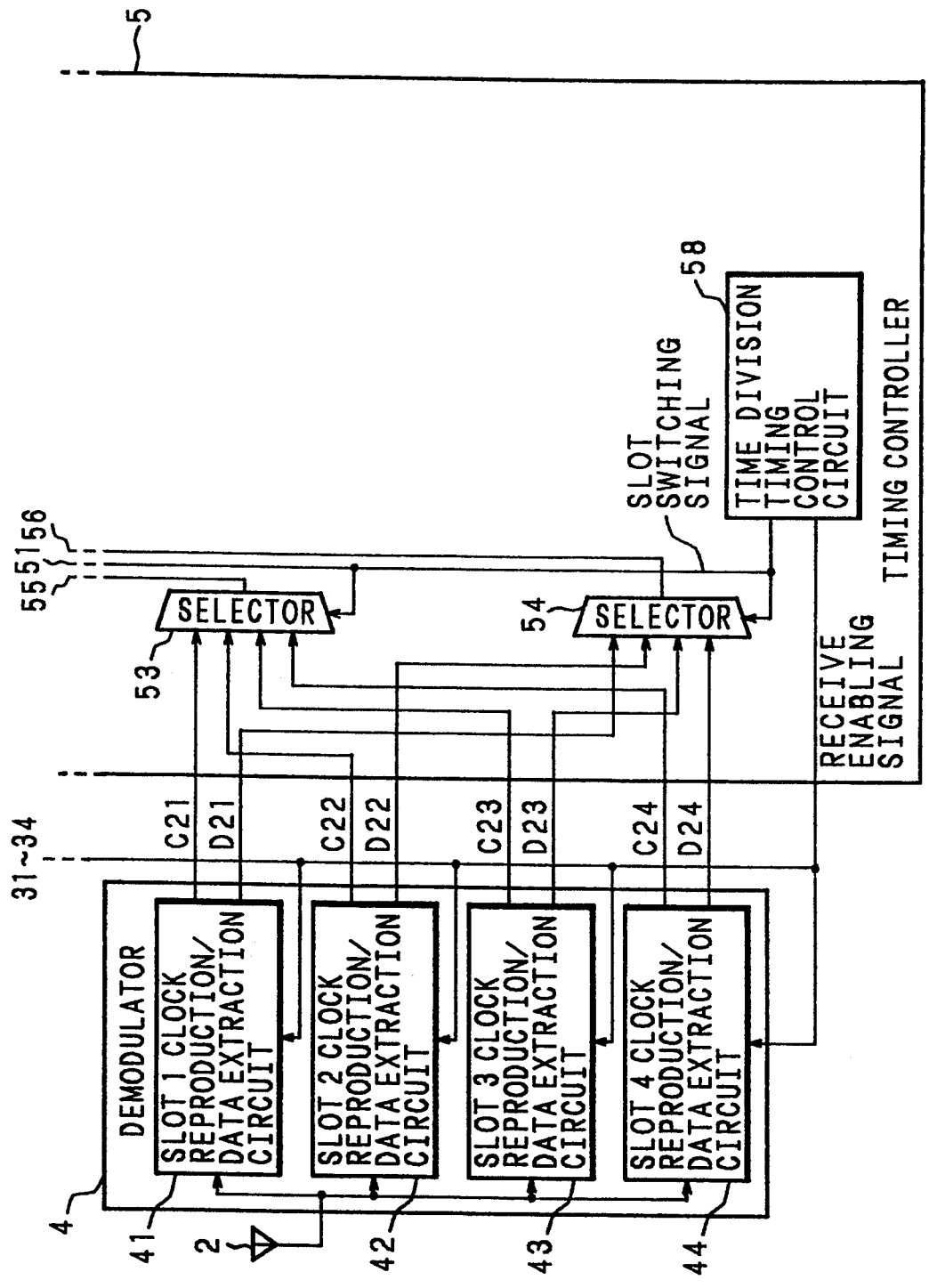

FIGS. 14(*a*)(*b*) are block circuit diagrams illustrative of the constitution of the third embodiment of the receiving circuit of the invention. Radio signals received on the antennas 1, 2 are inputted to the demodulators 3, 4 respectively. The demodulators 3, 4 are provided with clock reproduction/data extraction circuits 31, 32, ..., 44 which are allocated to the respective slots of the received signal. The demodulators 3, 4 demodulate the received signals. The clock reproduction/data extraction circuits 31, 32, ..., 44 extract data of the respective slots from the demodulated signals and reproduce the clock signals by using the extracted bit-serial data.

The reproduced clock signals C11, ..., C14 of the respective slots on the antenna 1, at the side of demodulator 3 are inputted to the selector 51. Reproduced data D11, ..., D14 of the antenna 1, demodulator 3 side are inputted to the selector 52.

Reproduced clock signals C21, ... C24 of the respective slots on the antenna 2, at the side of demodulator 4 are inputted to the selector 53. Reproduced data D21, ..., D24 on the antenna 2, demodulator 4 side are inputted to the selector 54.

The time division timing control circuit 58 sends receive enabling signal successively to the clock reproduction/data extraction circuits 31 (41), 32 (42), 33 (43) and 34 (44), and sends such a signal to the selector 52 (54) that causes the selector 52 (54) to select the received data D11, ... D14 (D21, ..., D24) which are outputted successively by the clock reproduction/data extraction circuits 31 (41), 32 (42), 33 (43) and 34 (44) upon receipt of receive enabling signal, and further sends such a signal to the selector 51 (53) that causes the selector 51 (53) to select the reproduced clock signals C11, ... C14 (C21, ..., C24) which are outputted successively by the clock reproduction/data extraction circuits 31 (41), 32 (42), 33 (43) and 34 (44) upon receipt of receive enabling signal.

Outputs of the selectors 52, 54 are sent to the selector 56, and outputs of the selectors 51, 53 are sent to the selector 55. Selection of the outputs of the selectors 55, 56 is made by selecting either the combination of the received data and the received clock signal from the antenna 1 or the combination of the received data and the received clock signal from the antenna 2, by means of the antenna switching signal given by the diversity control circuit 57 which monitors tile intensities of the signals received at the antennas and selects the antenna which gives signals of higher intensity.

The output of selector 55 is inputted to the switching circuit 60. The internal clock generation circuit 61 generates and outputs the internal clock signal having the same waveform as that of the received clock signal, and the internal clock signal is inputted to the switching circuit 60. The switching circuit 60 selects one of the inputs by means of the signals given from the time division timing control circuit 58 and the diversity control circuit 57. The selected clock signal and the received data selected by the selector 52 are outputted to the following circuit.

The time division timing control circuit 58 causes the switching circuit 60 to switch to the internal clock generation circuit 61 before the switching in the selectors 51, 53, and causes the switching circuit 60 to switch to the selectors 51, 53 after switching the received clock signals in the selectors 51, 53. Although outputs from the selector 51, 53 include spikes immediately after switching, the internal clock signal is outputted to the outside at this time, and therefore no effect is given to the outside.

The diversity control circuit 57 causes the switching circuit 60 to switch to the internal clock generation circuit 61 before switching the selector 55, and causes the switching circuit 60 to switch to the selector 55 after switching the received clock signal in the selector 55. Although output from the selector 55 includes spikes immediately after switching, the internal clock signal is outputted to the outside at this time, and therefore no effect is given to the outside.

Figure 15:
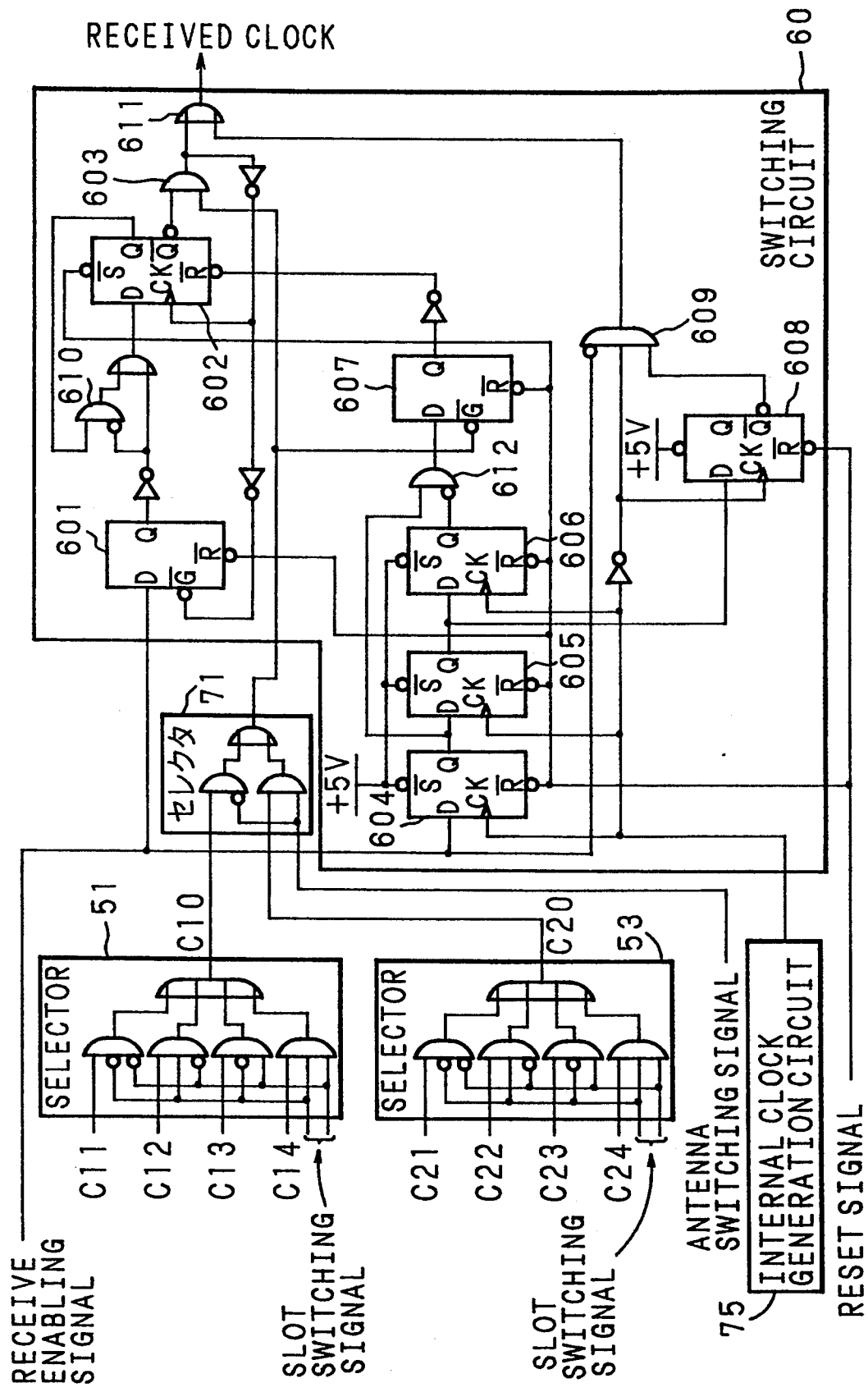
FIG. 15 is a circuit diagram of a timing controller of the 3rd embodiment of the receiving circuit of the invention.

FIG. 15 is a circuit diagram of a key section of the timing controller 5 of the receiving circuit shown in FIGS. 14(*a*),(*b*). The selectors 51, 53 have identical constitutions as that of the selector 51 shown in FIG. 3. The reproduced clock signals C10, C20 selected by the selectors 51, 53 are inputted to the selector 71. Because the constitution is similar to the circuit shown in FIG. 3 in other respects, description thereof will be omitted with identical symbols given to the corresponding parts.

In this circuit, too, the receive enabling signal is kept at "L" level during a period before and after switching in the selectors 51, 53, 71 to output the internal clock signal instead of the reproduced clock signal.

As this invention may be embodied in several forms without departing from the spirit Of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A receiving circuit which outputs plural time slots of time division multiplexed data transmitted by wireless communication and clock signals reproduced from the data while relating the data and the clock signals, the circuit comprising:
    a selector which receives reproduced clock signals of the respective time slots and selects one of said received clock signals reproduced from the data of the respective time slots and outputs said one selected reproduced clock signal;
    a time division timing control circuit, coupled to said selector, for separating the received data every time slot and switching an output of said selector in synchronism with the separation;
    an internal clock generation circuit for generating an internal clock signal; and
    a switching circuit which is supplied with the internal clock signal generated by said internal clock generation circuit and the reproduced clock signal selected by and outputted by said selector, and selects and outputs either the selected reproduced clock signal or the internal clock signal,
    said switching circuit including a circuit which selects and outputs the internal clock signal while said time division timing control circuit is switching the output of said selector.

2. A receiving circuit which receives data being transmitted by wireless communication with a plurality of antennas, and outputs the data received by an antenna which is selected by diversity control and a clock signal reproduced from the data while relating the data and the clock signal, the receiving circuit comprising:
    a selector which receives clock signals reproduced from the data received by said antennas and selects one of said clock signals reproduced from the data received by the antennas and outputs the selected reproduced clock signal;
    a diversity control circuit coupled to said selector, for switching an output of said selector in synchronism with the diversity control;
    an internal clock generation circuit for generating an internal clock signal; and
    a switching circuit which is supplied with said internal clock signal generated by said internal clock generation circuit and the selected reproduced clock signal outputted by said selector, and selects and outputs either the selected reproduced clock signal or the internal clock signal,
    said switching circuit including a circuit which selects and outputs the internal clock signal while said diversity control circuit is switching the output of said selector.

3. A receiving circuit which receives plural time slots of time division multiplexed data transmitted by wireless communication and received on a plurality of antennas, and outputs the plural time slots of data received on an antenna which is selected by diversity control and a clock signal reproduced from the respective data while relating the data and the clock signal, the receiving circuit comprising:
    a plurality of selectors each receiving clock signals reproduced from the data of the respective time slots selecting one of said clock signals reproduced from the data of the respective time slots and outputting a selected reproduced clock signal;
    a time division timing control circuit, coupled to said selectors, for separating the received data every time slot and switches outputs of said selectors in synchronism with the separation;
    a further selector which receives clock signals reproduced from the data received on said antennas and selects and outputs one of the received clock signals reproduced from the data received on said antennas;
    a diversity control circuit, coupled to said further selector, for switching an output of said further selector in synchronism with the diversity control;
    an internal clock generation circuit for generating an internal clock signal; and
    a switching circuit which is supplied with the internal clock signal generated by the internal clock generation circuit and the reproduced clock signal which is outputted by said further selector at inputs thereof, and selects and outputs either the internal clock signal or the selected reproduced clock signal,
    the switching circuit including a circuit which selects and outputs the internal clock signal while the time division timing control circuit is switching outputs of said plurality of selectors and the diversity control circuit is switching the output of said further selector.

* * * * *